United States Patent
Madey

(10) Patent No.: US 12,091,164 B2
(45) Date of Patent: *Sep. 17, 2024

(54) MULTI-ACTOR DAMPING SYSTEMS AND METHODS

(71) Applicant: GOODRICH CORPORATION, Charlotte, NC (US)

(72) Inventor: Kyle M. Madey, Broadview Heights, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1016 days.

This patent is subject to a terminal disclaimer.

(21) Appl. No.: 16/741,536

(22) Filed: Jan. 13, 2020

(65) Prior Publication Data
US 2021/0214074 A1 Jul. 15, 2021

(51) Int. Cl.
B64C 25/60 (2006.01)
F16F 9/10 (2006.01)
F16F 9/32 (2006.01)

(52) U.S. Cl.
CPC ............ B64C 25/60 (2013.01); F16F 9/10 (2013.01); F16F 9/3207 (2013.01)

(58) Field of Classification Search
CPC ............ B64C 25/60; F16F 9/10; F16F 9/3207
See application file for complete search history.

(56) References Cited

U.S. PATENT DOCUMENTS

| | | |
|---|---|---|
| 1,484,859 A | 2/1924 | Aker |
| 2,053,053 A | 9/1936 | Swalm |
| 2,212,541 A | 8/1940 | Isaacson |
| 2,559,633 A | 7/1951 | Katz |
| 2,814,482 A * | 11/1957 | Anderson ............... B64C 25/60 244/50 |
| 2,883,181 A * | 4/1959 | Hogan ...................... F16F 5/00 188/289 |

(Continued)

FOREIGN PATENT DOCUMENTS

| | | |
|---|---|---|
| DE | 477355 | 6/1929 |
| DE | 1094534 | 12/1960 |

(Continued)

OTHER PUBLICATIONS

USPTO, Notice of Allowance dated Nov. 24, 2021 in U.S. Appl. No. 16/741,579.

(Continued)

Primary Examiner — Melody M Burch
(74) Attorney, Agent, or Firm — SNELL & WILMER L.L.P.

(57) ABSTRACT

A metering pin for use in a multi-actor damping system is disclosed herein. The multi-actor damping system may be used in a shock strut assembly to alter a damping curve of the shuck strut assembly. The metering pin may be configured to transition the multi-actor damping system from a first damping actor configuration to a second damping actor configuration. The first damping actor configuration may correspond to a first damping curve. The second damping actor configuration may correspond to a second damping curve. The first damping curve being different than the second damping curve.

17 Claims, 27 Drawing Sheets

(56) References Cited

U.S. PATENT DOCUMENTS

| | | | | |
|---|---|---|---|---|
| 2,892,626 | A | * | 6/1959 | Hogan ................. B64C 25/22 |
| | | | | 267/64.22 |
| 2,916,283 | A | * | 12/1959 | Westcott, Jr. .......... B64C 25/60 |
| | | | | 267/64.15 |
| 3,152,667 | A | | 10/1964 | Powell |
| 4,054,311 | A | | 10/1977 | Gute |
| 4,061,295 | A | * | 12/1977 | Somm ................. B64C 25/60 |
| | | | | 188/289 |
| 4,595,159 | A | | 6/1986 | Hrusch |
| 4,666,180 | A | | 5/1987 | Shirakuma |
| 4,773,671 | A | | 9/1988 | Inagaki |
| 4,800,995 | A | | 1/1989 | Bernhardt |
| 5,027,844 | A | | 7/1991 | Forsythe |
| 5,269,558 | A | | 12/1993 | Yoshioka |
| 5,305,860 | A | * | 4/1994 | Rotharmel ............ F16F 9/467 |
| | | | | 188/266.2 |
| 5,368,142 | A | | 11/1994 | Ashiba |
| 5,533,597 | A | | 7/1996 | Nezu |
| 5,566,794 | A | | 10/1996 | Wiard |
| 5,732,906 | A | | 3/1998 | Wong |
| 5,961,069 | A | | 10/1999 | Perrier |
| 7,562,843 | B2 | | 7/2009 | Lipponen |
| 10,005,547 | B2 | | 6/2018 | Fraval et al. |
| 11,255,398 | B2 | * | 2/2022 | Madey ................. B64C 25/60 |
| 11,326,662 | B2 | * | 5/2022 | Madey ................. B60G 13/08 |
| 2021/0214074 | A1 | | 7/2021 | Madey |
| 2021/0215219 | A1 | | 7/2021 | Madey |

FOREIGN PATENT DOCUMENTS

| | | |
|---|---|---|
| FR | 1282582 | 1/1962 |
| FR | 2174980 | 10/1973 |
| FR | 2551160 | 3/1985 |
| FR | 2581724 | 11/1986 |
| GB | 669521 | 4/1952 |
| GB | 2075448 | 11/1981 |

OTHER PUBLICATIONS

USPTO, Notice of Allowance dated Feb. 7, 2022 in U.S. Appl. No. 16/741,601.
USPTO, Pre-Interview First Office Action dated Jun. 3, 2021 in U.S. Appl. No. 16/741,579.
European Patent Office, European Search Report dated Jun. 15, 2021 in Application No. 21151306.4.
European Patent Office, European Search Report dated Jun. 17, 2021 in Application No. 21151310.6.
European Patent Office, European Search Report dated Jun. 17, 2021 in Application No. 21151362.7.
USPTO, Non-Final Office Action dated Jul. 20, 2021 in U.S. Appl. No. 16/741,579.
USPTO, Non-Final Office Action dated Aug. 23, 2021 in U.S. Appl. No. 16/741,601.
European Patent Office, European Office Action dated Jun. 28, 2023 in Application No. 21151310.6.
National Institute of Industrial Property, Brazilian Office Action dated Apr. 15, 2024 in Application No. BR102021000450-9.
National Institute of Industrial Property, Brazilian Search Report dated Apr. 15, 2024 in Application No. BR102021000450-9.
National Institute of Industrial Property, Brazilian Office Action dated Apr. 15, 2024 in Application No. BR102021000478-9.
National Institute of Industrial Property, Brazilian Search Report dated Apr. 15, 2024 in Application No. BR102021000478-9.

* cited by examiner

Detail A

MULTI-ACTOR DAMPING SYSTEMS AND METHODS

FIELD

The present disclosure relates generally to a multi-actor damping system and, more particularly, to a multi actor damping system for use in a landing gear system.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

SUMMARY

A metering pin apparatus is disclosed herein. The metering pin apparatus may comprise an elongated member extending from a first end to a second end, the elongated member defining an axis, including a first side, a second side, a third side, and a fourth side, the first side disposed opposite the third side and the second side disposed opposite the fourth side; a first flute profile disposed in the first side, the first flute profile comprising a first groove; and a second flute profile disposed in the second side, the second flute profile comprising a second groove.

In various embodiments, the first flute profile is different than the second flute profile. The first flute profile may extend a first length along the elongated member, wherein the second flute profile extends a second length along the elongated member, wherein the first length is greater than the second length. The first groove and the second groove may be V-grooves. The first flute profile may be disposed on the third side, and wherein the second flute profile is disposed on the fourth side. A cross-section of the elongated member may be substantially trapezoidal. A cross-section of the elongated member may be substantially square.

A multi-actor damping system is disclosed herein. The multi-actor damping system may comprise: a main orifice plate; and a metering pin configured to transfer torque from the metering pin to the main orifice plate, the metering pin configured to transition the multi-actor damping system from a first damping actor configuration including a first damping curve to a second damping actor configuration including a second damping curve, the first damping curve being different from the second damping curve.

In various embodiments, the metering pin comprises an elongated body extending from a first end to a second end, the elongated body including a first side, a second side, a third side, and a fourth side, wherein the first side is disposed opposite the third side, and wherein the second side is disposed opposite the fourth side. The multi-actor damping system of claim 9, wherein the first side comprises a first V-groove, and wherein the second side comprises a second V-groove. The first V-groove may extend a first length of the metering pin. The second V-groove may extend a second length of the metering pin. The first length may be greater than the second length. The main orifice plate may comprise an aperture, wherein the aperture may be complimentary to a cross-section shape of the metering pin. The metering pin may be disposed through the aperture. The multi-actor damping system may further comprise a damping actor selector configured to rotate the metering pin and the main orifice plate.

A shock strut assembly is disclosed herein. The shock strut assembly may comprise: a strut cylinder including a primary chamber; a strut piston, the strut cylinder configured to receive the strut piston; an orifice support tube positioned within the primary chamber of the strut cylinder; a main orifice assembly disposed within the orifice support tube, the main orifice assembly including a main orifice plate; and a metering pin positioned within the primary chamber, the metering pin defining an axis, the metering pin configured to translate with the strut piston, the metering pin configured to rotate about the axis and transition the shock strut assembly from a first damping actor configuration to a second damping actor configuration.

In various embodiments, the metering pin includes an elongated member, the elongated member including a quadrilateral cross section having a first side, a second side, a third side, and a fourth side, wherein the first side is opposite the third side and the second side is opposite the fourth side. The shock strut assembly may further comprise a first flow restrictor coupled to the main orifice plate, the first flow restrictor configured to contact the metering pin in the first damping actor configuration, the first flow restrictor configured to be separated from the metering pin in the second damping actor configuration. The metering pin may further comprise a first V-groove disposed on the first side, a second V-groove disposed on the second side, a third V-groove disposed on the third side; and a fourth V-groove disposed on the fourth side. The shock strut assembly may further comprise a damping actor selector configured to rotate the metering pin about the axis. The first damping actor configuration may include a first damping curve, wherein the second damping actor configuration includes a second damping curve, and wherein the first damping curve is different from the second damping curve.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

A multi-actor damping system is disclosed. The multi-actor damping system may be used in a shock strut assembly to alter a damping curve of the shuck strut assembly. A "damping curve," as disclosed herein is the relationship between shock strut damping and stroke. A multi-actor damping system, as disclosed herein, may be configured to alter a damping curve by clocking a metering pin and/or main orifice plate to various positions. In various embodiments, a metering pin of a shock strut assembly may comprise a damping profile. A "damping profile," as disclosed herein, is a varying cross sectional area of the metering pin over its length to establish a respective damping curve associated with the metering pin.

In various embodiments, a shock strut assembly may include a plurality of damping actor configurations. A "damping actor configuration," as disclosed herein, is any configuration of the shuck strut assembly that produces a unique damping curve. A main orifice assembly of the shock strut assembly may be configured to produce any number of damping actor configurations. The main orifice assembly may be configured to add or subtract flow are from the damping profile in response to altering a position of the main orifice assembly and/or the metering pin. The shuck strut assembly may include various actor angles corresponding to a respective damping actor configuration. An "actor angle," as disclosed herein, is a relative clock angle between the metering pin and a strut cylinder. The actor angle determines which damping actor configuration is active.

The multi-actor damping system uses the actor angle to add or subtract flow area from the damping profile of the metering pin and/or alter a discharge coefficient. The system may allow selection of various pre-defined damping actor configurations. The strut performance may be enhanced by allowing selection of a damping profile based on a given activity of an aircraft (e.g., a landing damping actor, a catapult damping actor, a taxi damping actor, a short takeoff and vertical landing (STOVL) damping actor, a percolation damping actor, or the like.

Figure 1:
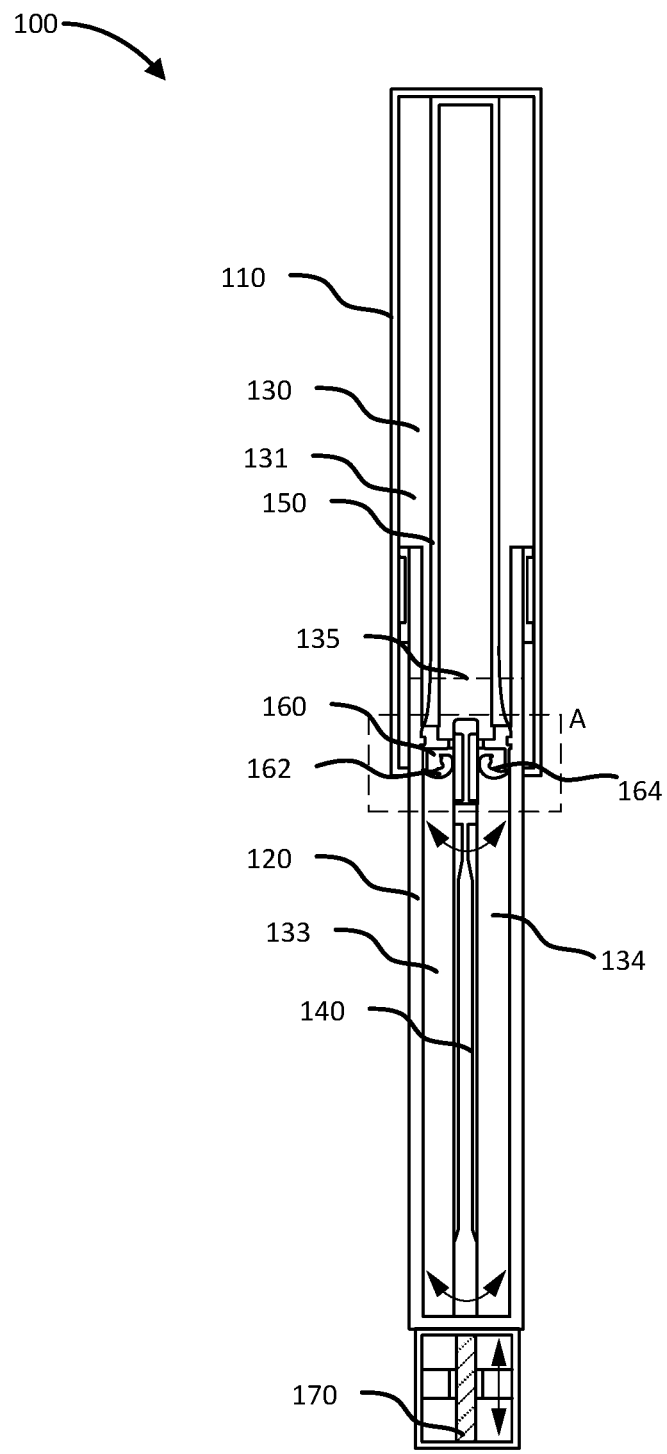
- FIG. 1 illustrates a shock strut assembly, in accordance with various embodiments.

Referring now to FIG. 1, a shock strut assembly 100 for use in a landing gear system, in accordance with various embodiments, is illustrated. The shock strut assembly 100 may comprise a strut cylinder 110, a strut piston 120, a metering pin 140, an orifice support tube 150, and a main orifice assembly 160. Strut piston 120 may be operatively coupled to strut cylinder 110 as described herein. Strut cylinder 110 may be configured to receive strut piston 120 in a manner that allows the two components to telescope together and absorb and/or dampen forces transmitted thereto. In various embodiments, a liquid, such as a hydraulic fluid and/or oil may be located within strut cylinder 110. A gas, such as nitrogen or air, may also be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut assembly 100 may comprise a low pressure, primary chamber 130 in which oil and gas can mix. In this regard, a volume of gas (also referred to herein as a primary chamber gas volume) 131 and a volume of oil (also referred to herein as an oil volume) 133 may be contained within primary chamber 130. A portion of primary chamber 130 may contain the primary chamber gas volume 131 and may be referred to as a primary gas chamber 132. Similarly, the portion of primary chamber 130 containing the oil volume 133 may be referred to herein as an oil chamber 134. Dashed line 135 represents the level of oil volume 133, or the interface between the oil chamber 134 and the primary gas chamber 132. Stated differently, the oil volume 133 may be located below dashed line 135 and primary chamber gas volume 131 may be located above dashed line 135. In this regard, the interface between the oil chamber 134 and the primary gas chamber 132 may move relative to primary chamber 130 depending on the position of strut piston 120 relative to strut cylinder 110.

The metering pin 140 and the orifice support tube 150 may be positioned within primary chamber 130. The metering pin 140 may translate with strut piston 120 with respect to main orifice assembly 160. In various embodiments, the metering pin 140 may be configured to rotate about a centerline of the metering pin 140. In various embodiments, the orifice support tube 150 may be configured to rotate about a centerline of the orifice support tube 150. By rotating the metering pin 140 or the orifice support tube 150, the shock strut assembly 100 may change from a first damping actor configuration to a second damping actor configuration.

In various embodiments, the shock strut assembly 100 further comprises a damping actor selector 170. The damping actor selector 170 is configured to rotate metering pin 140 relative to the strut piston 120. In various embodiments, the damping actor selector 170 may be coupled to the orifice support tube 150 and configured to rotate the orifice support tube 150 relative to the metering pin 140. The damping actor selector 170 may provide position control by direct drive, transmitted through a linkage, or any other method of position control known in the art. For example, the damping actor selector 170 may comprise hydraulic or pneumatic actuation. In this regard, pressure may be used to drive a piston head of the damping actor selector 170 linearly along the centerline of metering pin 140. As the piston moves, it may cause the metering pin 140 to rotate due to a screw thread interface between the metering pin 140 and the piston of the damping actor selector 170.

In various embodiments, external supply pressure may be applied by oil volume 133 in oil chamber 134 and automatically return the damping actor selector to a neutral or default damping actor configuration. The pressure may be configured to translate the piston of the damping actor selector along the centerline of the metering pin 140 to change damping actor configurations. This configuration may provide an inherent safety feature of providing its own power source to return the damping actor selector 170 to a default damping actor configuration.

In various embodiments, the damping actor selector 170 may comprise an electric stepper, servo motor, or the like. A stepper motor may provide accurate angular positioning with an open loop design. A servo motor may produce accurate position and/or may provide a closed loop system. The damping actor selector 170 may interface with an aircraft control system. The aircraft control system may be configured to control damping actor selector 170 and/or alter the shock strut assembly from a first damping actor configuration to as second damping actor configuration.

Figure 2:
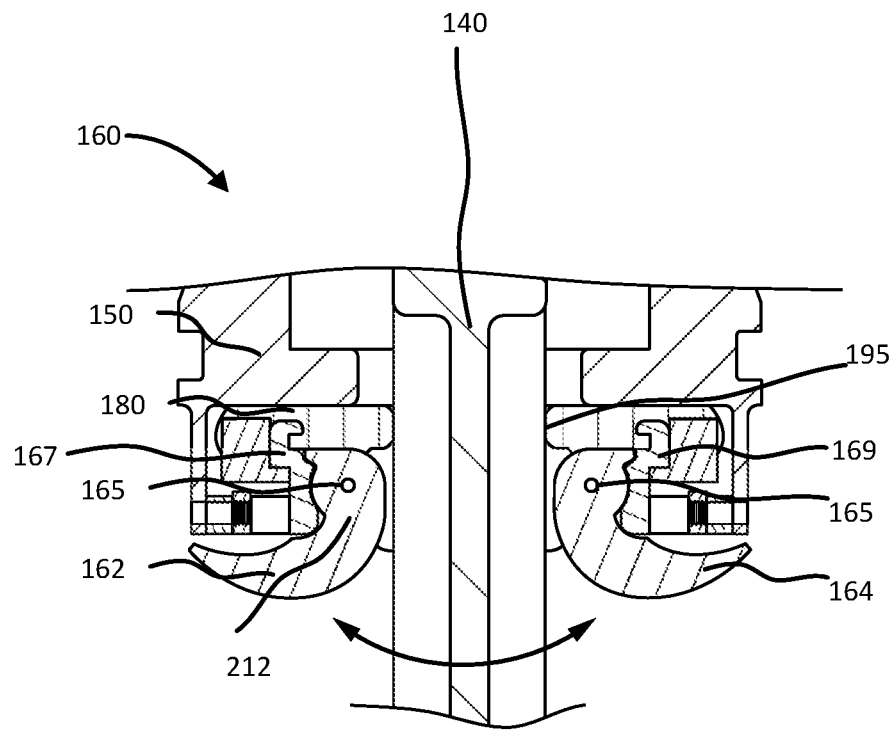
FIG. 2 illustrates a detail of a shock strut assembly, in accordance with various embodiments.

Referring now to FIG. 2, detail A of shock strut assembly 100 from FIG. 1, in accordance with various embodiments, is illustrated. In various embodiments, main orifice assembly 160 further comprises a main orifice plate 180. Main orifice plate 180 may be disposed in a recess of orifice support tube 150. Main orifice plate is coupled to first flow restrictor 162 and/or second flow restrictor 164. The first flow restrictor 162 and the second flow restrictor 164 may each comprise an aperture 165 extending through the flow restrictor and defining a fulcrum about which first flow restrictor 162 and second flow restrictor 164 pivot. Main orifice plate 180 may be configured to rotate with the metering pin 140. For example, when metering pin 140 is rotated, it transitions torque to the main orifice plate 180 via interface 195 between an aperture in main orifice plate 180 and a side of metering pin 140. In various embodiments, main orifice plate 180 may be configured to rotate with orifice support tube 150 relative to metering pin 140.

In various embodiments, the main orifice assembly 160 further comprises a first orbit cam 167 and a second orbit cam 169. First orbit cam 167 and second orbit cam 169 may be configured to remain stationary as metering pin 140 and main orifice plate 180 rotate. Each orbit cam is configured to guide a respective flow restrictor from a first damping actor configuration to a second damping actor configuration. For example, as main orifice plate 180 rotates about the centerline of metering pin 140, a head portion of a respective flow restrictor is guided in a respective orbit cam. For example, head portion 610 of first flow restrictor 162 may be guided in a respective track or groove of second orbit cam 169. The track or groove of second orbit cam 169 may be configured to cause first flow restrictor 162 to pivot about the fulcrum either towards the metering pin 140 or away from the metering pin 140.

Figure 3:
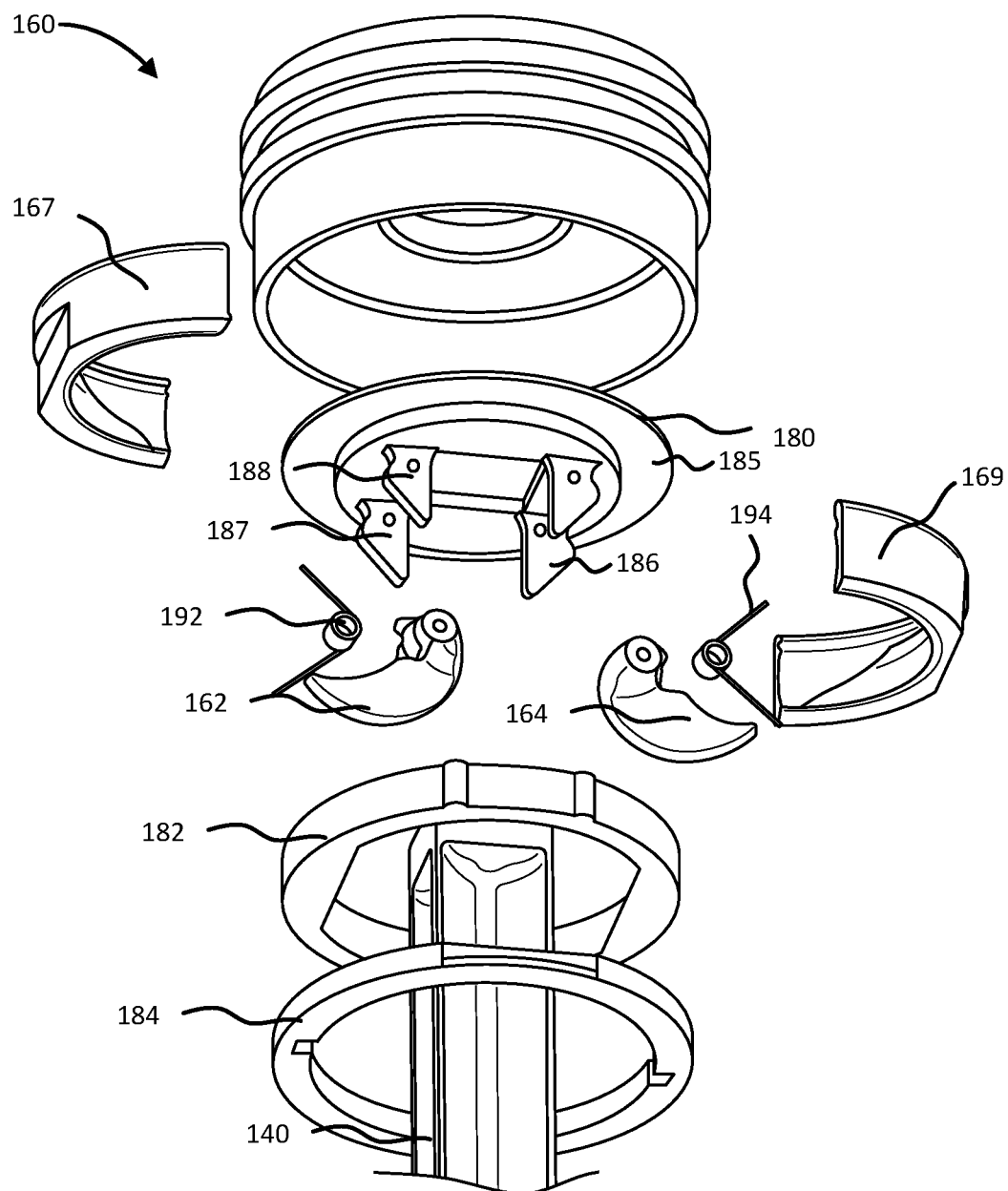
FIG. 3 illustrates a portion of a shock strut assembly, in accordance with various embodiments.

Referring now to FIG. 3, an exploded view of a main orifice assembly 160, in accordance with various embodiments, is illustrated. In various embodiments, main orifice assembly 160 further comprises a main orifice plate mount 182 and a main orifice plate retainer 184. The main orifice plate mount 182 may be configured to allow the main orifice plate 180 to be restrained axially and/or also allow the main orifice plate to rotate freely about the centerline of metering pin 140. In various embodiments, the main orifice plate retainer 184 is configured to retain the main orifice plate mount 182 axially. For example, main orifice plate retainer 184 may couple to the main orifice plate mount 182 and hold the main orifice plate mount 182 in place.

In various embodiments, the main orifice assembly 160 further comprises a first spring 192 and a second spring 194. Each spring may be coupled to a respective flow restrictor. For example, first spring 192 is coupled to first flow restrictor 162 and second spring 194 is coupled to second flow restrictor 164. Each spring may be configured to load a respective flow restrictor against metering pin 140 in a respective damping actor configuration. Each spring may comprise a torsion spring, or the like. For example, first spring 192 may be configured to apply a torque to first flow restrictor 162 about the fulcrum defined by aperture 165 of the first flow restrictor 162 in a first damping actor configuration. In doing so, a damping curve of the shock strut assembly 100 may be altered.

In various embodiments, the main orifice plate 180 may further comprise a plate portion 185 and a plurality of lugs 186. The plurality of lugs 186 may extend axially from a surface of plate portion 185. Each flow restrictor may couple to a first lug and a second lug from the plurality of lugs. For example, first flow restrictor 162 may be coupled to first lug 187 and second lug 188 form the plurality of lugs 186.

Figure 4:
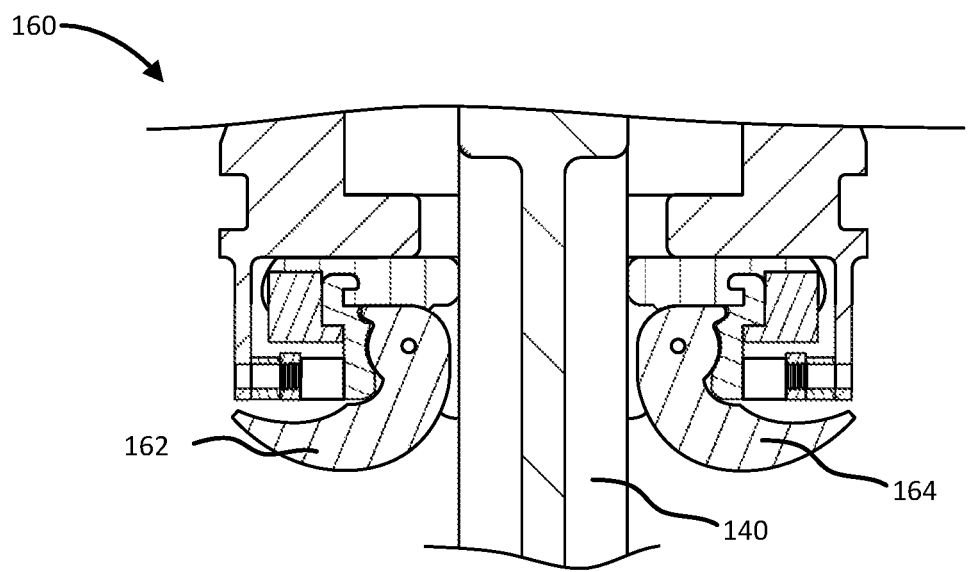
FIG. 4 illustrates a portion of a shock strut assembly including flow restrictors in a retracted position.

Referring now to FIG. 4, a cross-section of main orifice assembly 160 in a first damping actor configuration, in accordance with various embodiments, is illustrated. In the first damping actor configuration, first flow restrictor 162 and second flow restrictor 164 may be fully retracted. "Fully retracted," as disclosed herein, occurs when each flow restrictor is not in contact with metering pin 140. While fully retracted, the first flow restrictor 162 and the second flow restrictor 164 have little to no effect on the damping curve. In various embodiments, when the first flow restrictor 162 and the second flow restrictor 164 are retracted, the damping curve is based on a damping curve associated with a profile of the metering pin 140.

Figure 5:
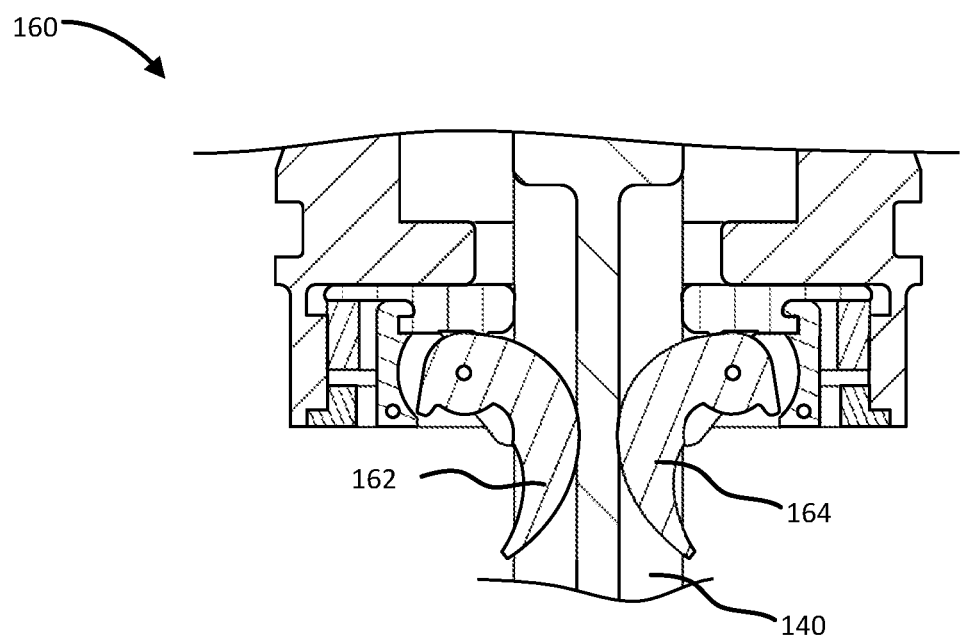
FIG. 5 illustrates a portion of a shock strut assembly including flow restrictors in a deployed position.

Referring now to FIG. 5, a cross-section of main orifice assembly 160 in a second damping actor configuration, in accordance with various embodiments, is illustrated. In the second damping actor configuration, first flow restrictor 162 and second flow restrictor 164 may be fully deployed. "Fully deployed," as disclosed herein, occurs when each flow restrictor is in contact with metering pin 140. While fully deployed, the first flow restrictor 162 and the second flow restrictor 164 effect the damping curve and/or provide enhanced damping relative to the first damping actor configuration. In various embodiments, when the first flow restrictor 162 and the second flow restrictor 164 are deployed, the damping curve is based on a damping curve associated with the profile of the metering pin 140 as well as a profile of the first flow restrictor 162 and the second flow restrictor 164.

Figure 6:
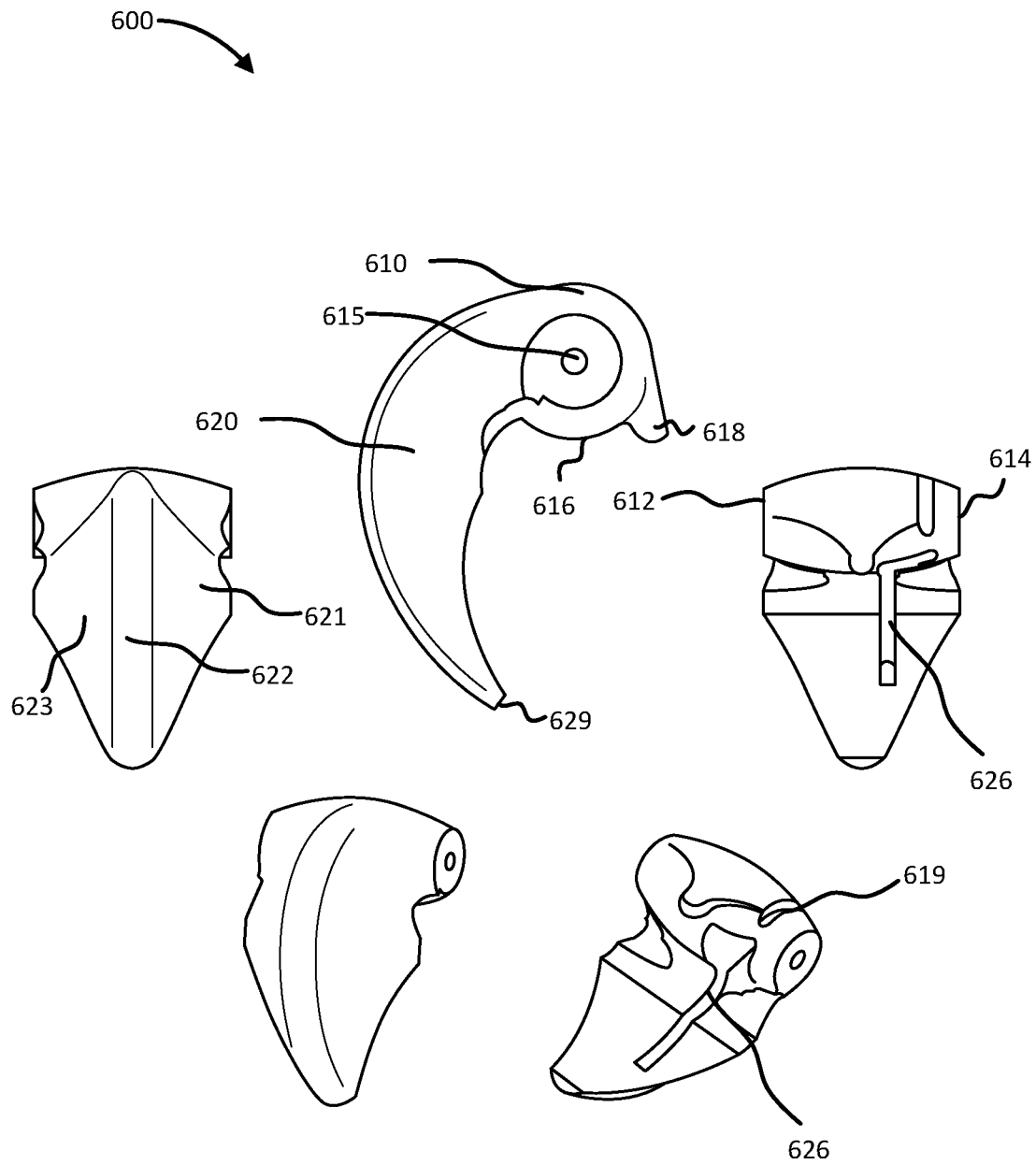
FIG. 6 illustrates a flow restrictor, in accordance with various embodiments.

Referring now to FIG. 6, various views of a flow restrictor 600, in accordance with various embodiments, is illustrated. First flow restrictor 162 and second flow restrictor 164 may be in accordance with flow restrictor 600. The flow restrictor 600 comprises a head portion 610 and a restrictor portion 620.

Head portion 610 comprises a first mating surface 612 and a second mating surface 614. First mating surface 612 may be disposed opposite second mating surface 614. First mating surface 612 may be configured to mate to a lug in the plurality of lugs 186 of main orifice plate 180 (as shown in FIG. 3). Similarly, second mating surface 614 may be configured to mate to a lug in the plurality of lugs 186 of main orifice plate 180. Head portion 610 may further comprise an aperture 615 extending through head portion 610 from first mating surface 612 to second mating surface 614. In various embodiments, the aperture 615 may act as a fulcrum for the flow restrictor 600. Head portion may further comprise a protrusion 618 extending from an outer surface 616 of head portion 610. The protrusion 618 may be configured to rotate the flow restrictor 600. For example, protrusion 618 may contact a respective orbit cam (e.g., first orbit cam 167 for first flow restrictor 162) and/or protrusion 618 may be guided by a track on an inner surface of a respective orbit during deploying and/or retracting flow restrictor 600.

In various embodiments, restrictor portion 620 may comprise a spine 622 extending from head portion 610 to a tail end 629 of the flow restrictor 600. In various embodiments, the spine 622 may define an arc or the like. The spine 622 may be disposed between a first convex surface 621 and a second convex surface 623. The spine 622, the first convex surface 621, and the second convex surface 623 may be configured to interface with a flute and/or groove disposed in metering pin 140 (from FIG. 2) when the flow restrictor 600 is in a deployed position. In various embodiments, the spine 622, the first convex surface 621 and the second convex surface 623 may define an outer surface of restrictor portion 620.

In various embodiments, restrictor portion 620 may comprise a concave surface 625 disposed opposite the first convex surface 621 and the second convex surface 623. The concave surface 625 may include a first recess 626 disposed therein. The first recess 626 may be configured to receive a spring. The first recess 626 may be disposed on a portion of the concave surface 625 and a portion of head portion 610.

In various embodiments, head portion 610 may further comprise a second recess 619. Second recess 619 and first recess 626 may partially define a channel. The channel may be configured to receive a spring, in accordance with various embodiments.

Figure 7:
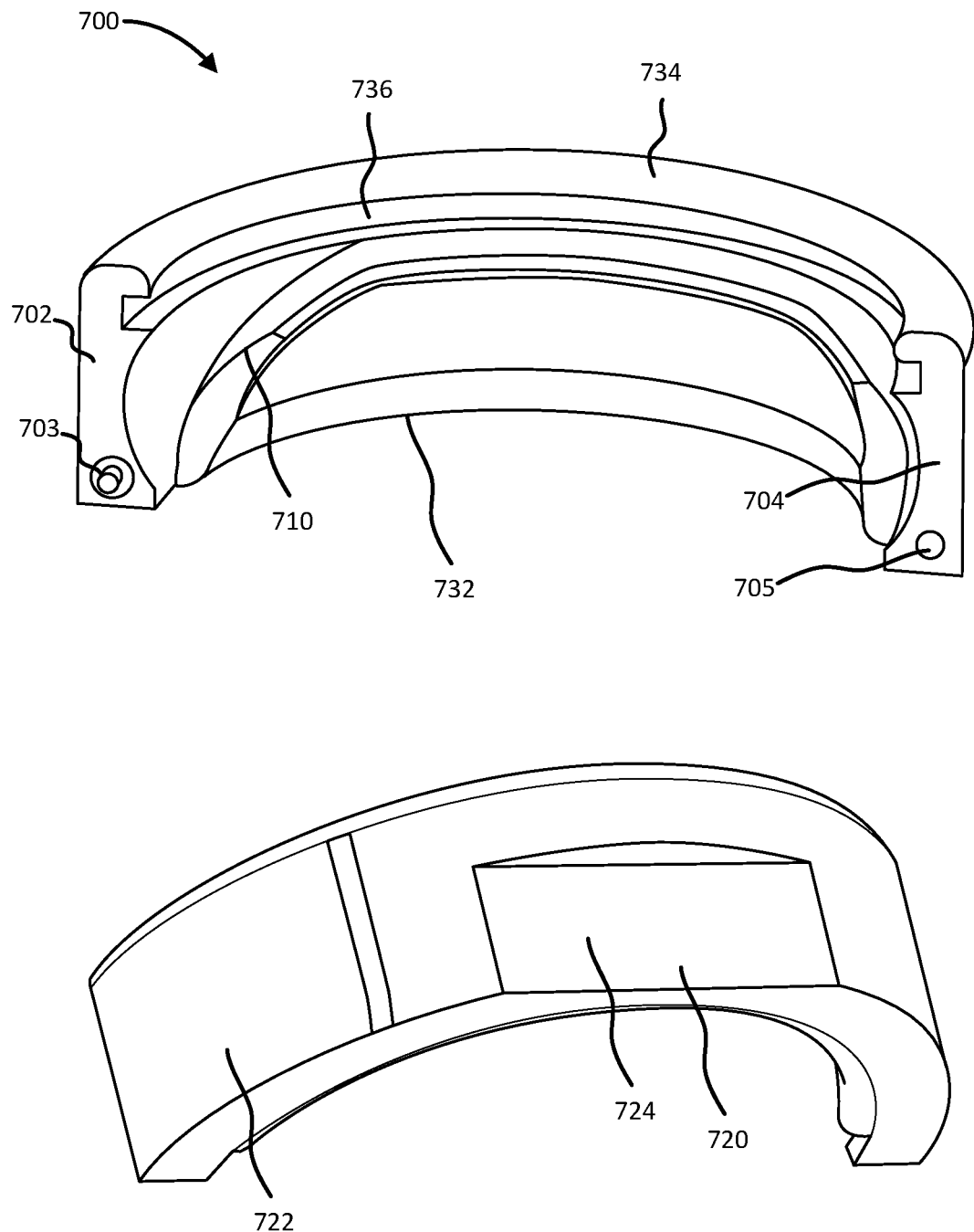
FIG. 7 illustrates an orbit cam, in accordance with various embodiments.

Referring now to FIG. 7, an orbit cam 700, in accordance with various embodiments, is illustrated. In various embodiments, orbit cam 700 is semi-annular. The orbit cam may comprise a first mating surface 702 and a second mating surface 704. First mating surface 702 may include a male fastener 703. Second mating surface 704 may include a female fastener 705. In various embodiments, the first mating surface 702 and second mating surface 704 may both contain male fasteners or the first mating surface 702 and second mating surface 704 may both contain female fasteners. By having a male fastener on one mating surface and a female mating fastener on a second mating surface, a first orbit cam may be coupled to a second orbit cam and both the first orbit cam and the second orbit cam may have the same geometry. For example, first orbit cam 167 and second orbit cam 169 may both be in accordance with orbit cam 700.

Orbit cam 700 may further comprise a guide ramp 710 disposed on a radially inner surface 712 of orbit cam 700. Guide ramp 710 may extend radially inward from the radially inner surface 712 from a first axially end and extend axially and circumferentially about radially inner surface 712. With combined reference to FIGS. 6 and 7, guide ramp 710 may be configured to guide the protrusion 618 of a head portion 610 of a flow restrictor 600. For example, guide ramp 710 may alter an axial position of protrusion 618 and either retract or deploy flow restrictor 600.

Orbit cam 700 may further comprise an anti-rotation feature 720. The anti-rotation feature 720 may be disposed on a radially outer surface 722 of the orbit cam 700. The anti-rotation feature 720 may be a flat recess 724 disposed on the radially outer surface 722. The anti-rotation feature 720 may be configured to interface with a corresponding anti-rotation feature on the main orifice plate mount 182 (as shown in FIG. 3).

In various embodiments, orbit cam 700 comprises a proximal end 732 and a distal end 734 disposed distal in an axial direction from the proximal end 732. Orbit cam 700 may comprise a groove 736 disposed proximate distal end 734. The groove 736 may be configured to receive a tongue from a mating main orifice plate (e.g., main orifice plate 180). As such, the main orifice plate may rotate while the orbit cam 700 may remain stationary.

Figures 8A, 8B:
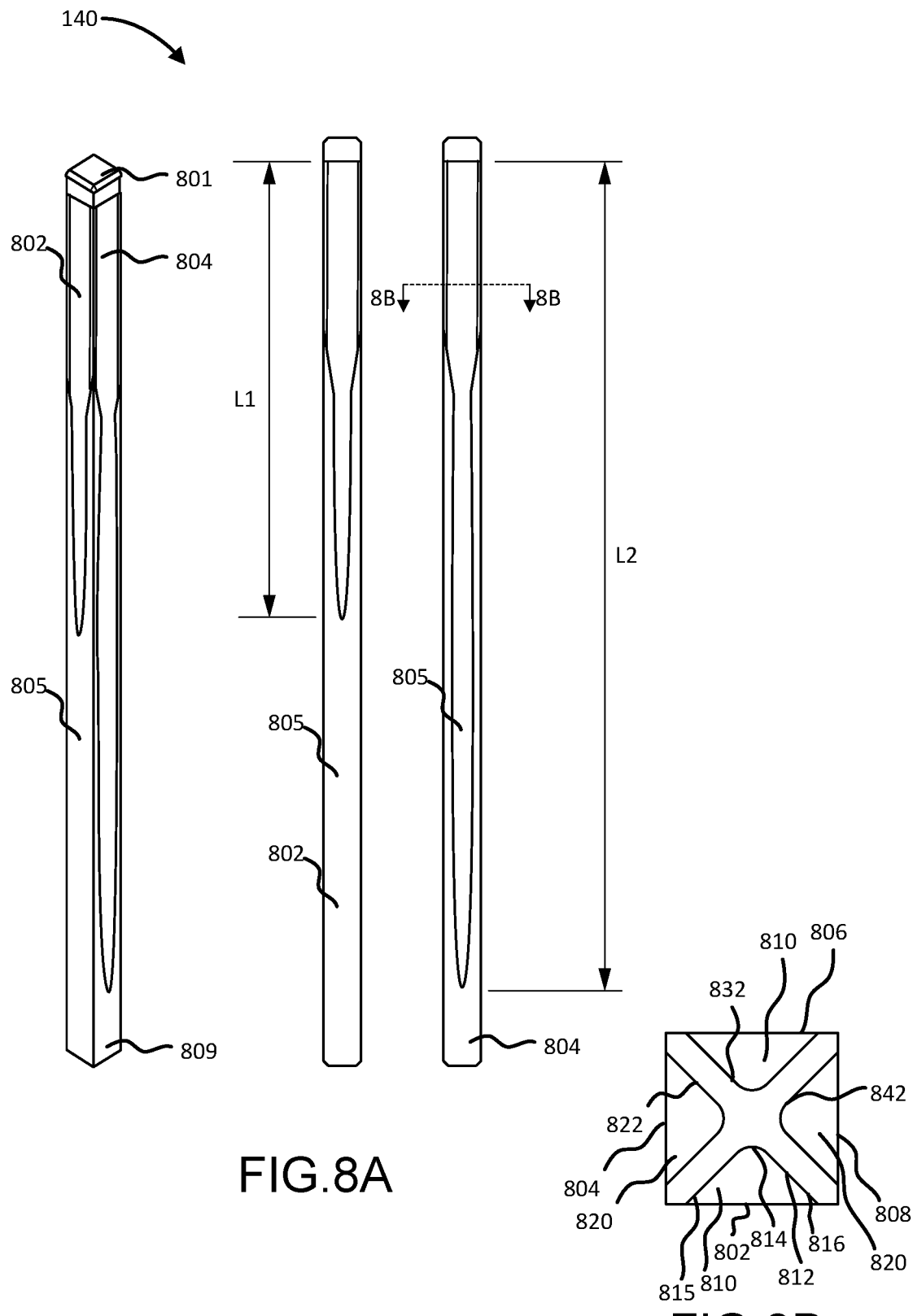
FIG. 8A illustrates a perspective and side view of a metering pin, in accordance with various embodiments.
FIG. 8B illustrates a cross-section of a metering pin of FIG. 8A, in accordance with various embodiments.

Referring now to FIG. 8A, a metering pin 140, in accordance with various embodiments. The metering pin 140 may comprise an elongated member 805 extending from a first end 801 to a second end 809 and defining a central axis. The elongated member 805 may include a quadrilateral cross-section. In various embodiments, the quadrilateral cross-section may comprise a trapezoidal cross-section, a square cross-section, or the like. In various embodiments, the first end 801 may comprise a quadrilateral cross section (e.g., a trapezoidal cross section, a square cross section, or the like). A square cross-section may provide enhances torque transfer properties. A trapezoidal cross-section may provide mistake proofing during assembly of a main orifice assembly. In various embodiments, with reference now to FIG. 8B, a cross-section along section line A-A of metering pin 140 is illustrated, in accordance with various embodiments.

With combined reference now to FIGS. 8A and 8B, on a first side 802 of the quadrilateral cross section of the metering pin 140, the metering pin 140 may comprise a first flute profile 810. In various embodiments, first flute profile 810 may comprise a groove 812 disposed in the first side 802 of the quadrilateral cross section. In various embodiments, the groove may be a V-groove, a V-groove with a fillet, or the like. The first flute profile 810 may extend a length L1 of the metering pin 140. The length L1 of the first flute profile 810 may correspond to a full stroke length of a strut stroke for a shock strut assembly (e.g., shock strut assembly 100 from FIG. 1). In various embodiments, L1 may be between 75% and 95% of a length of metering pin 140. In various embodiments, the first flute profile 810 may be disposed on a third side 806 of the quadrilateral cross section of the metering pin 140. The third side 806 may be opposite the first side 802. The third side 806 may comprise a groove 832 in accordance with groove 812.

In various embodiments, on a second side 804 of the quadrilateral cross section of the metering pin 140, the metering pin 140 may comprise a second flute profile 820. The second side 804 may be adjacent to the first side 802 and the third side 806. In various embodiments, second flute profile 820 may comprise a groove 822 disposed in the second side 804 of the quadrilateral cross section. In various embodiments, the groove may be a V-groove, a V-groove with a fillet, or the like. The second flute profile 820 may extend a length L2 of the metering pin 140. The length L2 of the second flute profile 820 may correspond to approximately a half stroke length of a strut stroke for a shock strut assembly (e.g., shock strut assembly 100 from FIG. 1). In various embodiments, L2 may be between 35% and 65% of a length of metering pin 140. In various embodiments, the second flute profile 820 may be disposed on a fourth side 808 of the quadrilateral cross section of the metering pin 140. The fourth side 808 may be opposite the second side. The fourth side 808 may comprise a groove 842 in accordance with groove 822. In various embodiments, grooves 812, 822, 832, 842 may all be the same.

In various embodiments, first flute profile 810 may be configured to be effective across a full stroke range. In various embodiments, second flute profile 820 may be configured to be effective from a fully extended stroke to approximately half of a stroke. The combination of first flute profile 810 and second flute profile 820 used in combination is greater damping as a function of stroke compared to utilizing only first flute profile 810 or only second flute profile 820.

In various embodiments, with combined reference to FIGS. 6 and 8A-8B, grooves 812, 822, 832, 842 may all be configured to interface with a restrictor portion 620 of flow restrictor 600 when a flow restrictor 600 is in a fully deployed position in a main orifice assembly. For example, a fillet portion 814 of groove 812 may be configured to interface with the spine 622 of restrictor portion 620 of flow restrictor 600. Similarly, first convex surface 621 may be configured to interface with first wall 815 of groove 812 and the second convex surface 623 of the restrictor portion 620 of flow restrictor 600 may be configured to interface with second wall 816 of groove 812.

Figure 9A:
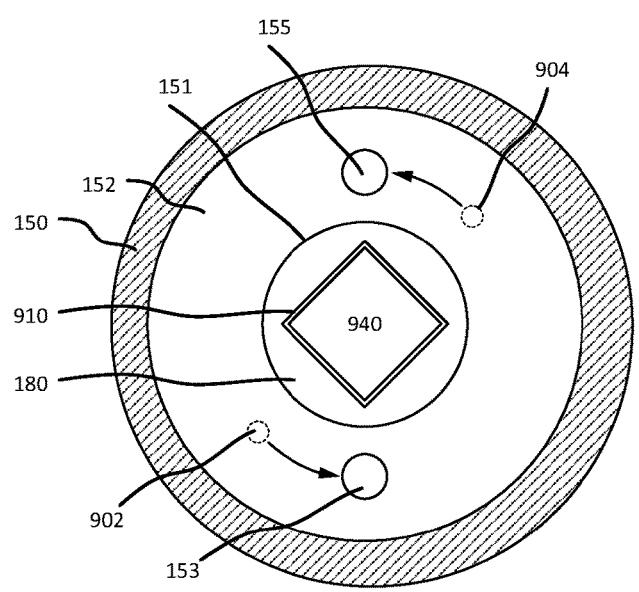
FIG. 9A illustrates a portion of a shock strut assembly in a bypass closed position, in accordance with various embodiments.
Figure 9B:
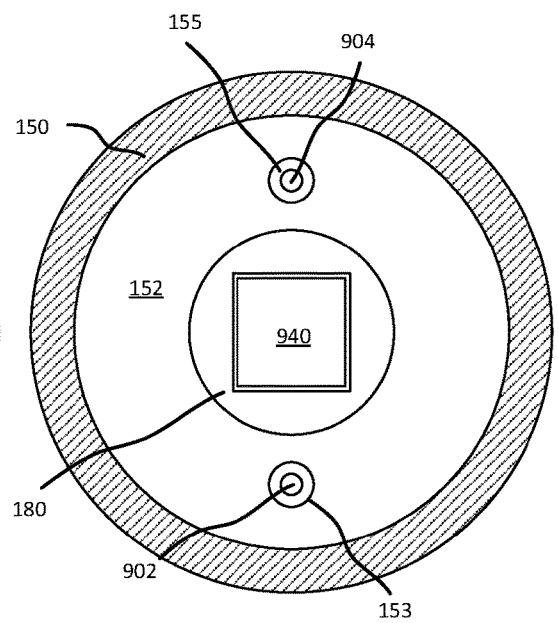
FIG. 9B illustrates a portion of a shock strut assembly in a bypass open position, in accordance with various embodiments.

Referring now to FIGS. 9A and 9B, a portion of a shock strut assembly along a top view, in accordance with various embodiments, is illustrated. In various embodiments, the orifice support tube 150 may further comprise a coupling end 152 disposed axially adjacent to the main orifice plate 180. Main orifice plate 180 may comprise an aperture 910. Aperture 910 may correspond to a cross-sectional shape of metering pin 940 (e.g., a quadrilateral shape, or the like). The metering pin 940 may be disposed in aperture 910 and configured to transfer torque from the metering pin 940 to the main orifice plate 180 in order to clock a main orifice assembly (e.g., main orifice assembly 160 from FIG. 3), in accordance with various embodiments. In various embodiments, the metering pin 940 may be in accordance with the metering pin 140 from FIGS. 8A-8B.

In various embodiments, coupling end 152 may comprise a clearance aperture 151. Clearance aperture 151 may be configured to receive the metering pin 140 therethrough. Disposed radially outward from the clearance aperture 151, the coupling end 152 may further comprise a first bypass alignment aperture 153. In various embodiments, the coupling end 152 further comprises a second bypass alignment aperture 155 disposed approximately 180 degrees from the first bypass alignment aperture 153 on coupling end 152. Any number of bypass alignment apertures located in any radial position on coupling end 152 is within the scope of this disclosure.

In various embodiments, main orifice plate 180 may further comprise a first bypass aperture 902 disposed radially outward from aperture 910. In various embodiments, main orifice plate 180 may further comprise a second bypass aperture 904 disposed approximately 180 degrees from the first bypass aperture 902. Any number of bypass apertures located in any radial position on main orifice plate 180 is within the scope of this disclosure. In various embodiments, the number of bypass alignment apertures on coupling end 152 corresponds to a number of bypass apertures on main orifice plate 180. In various embodiments, the orientation of the bypass alignment apertures on coupling end 152 relative to each other may correspond to the orientation of the bypass apertures on main orifice plate 180.

Referring now to FIG. 9A only, a bypass closed configuration of a shock strut assembly 100 from FIG. 1 is illustrated, in accordance with various embodiments. The bypass closed configuration may occur when first bypass aperture 902 of main orifice plate 180 is misaligned circumferentially with first bypass alignment aperture 153 of coupling end 152. Similarly, the second bypass aperture 904 of main orifice plate 180 may be misaligned circumferentially with second bypass alignment aperture 155 when in the bypass closed configuration.

A multi-actor damping system could open and close bypass apertures 902, 904 depending on the actor angle. After rotating the main orifice plate 180 as shown in FIG. 9A, the bypass apertures 902, 904 may be aligned with bypass alignment apertures 153, 155 of coupling end 152 and open the bypass apertures 902, 904, as shown in FIG. 9B. As such, FIG. 9B represents a bypass closed configuration of a shock strut assembly, in accordance with various embodiments. Utilizing bypass apertures in this manner may provide various damping actor configurations with or without the use of flow restrictors. In various embodiments, bypass apertures 902, 904 may shift an entire damping curve higher or lower depending on whether they are in an open configuration or a closed configuration.

Controlling the bypass area may also be beneficial with regard to percolation, which occurs from a restriction of gas and oil flow across the main orifice plate 180 when the hydraulic chamber is refilling after a landing gear has been stored for flight and then extended for landing.

Figure 10A:
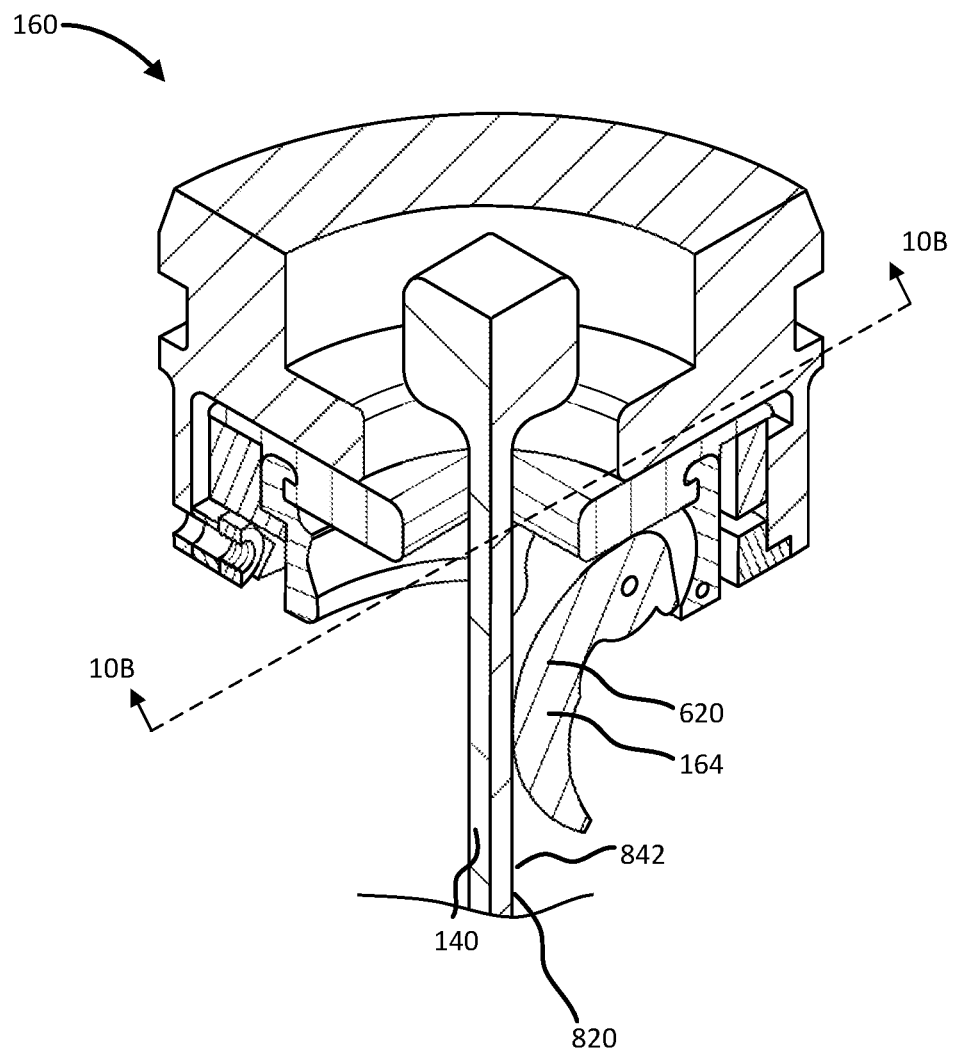
FIG. 10A illustrates a cross-section of a portion of a shock strut assembly having a first damping actor configuration, in accordance with various embodiments.
Figure 10B:
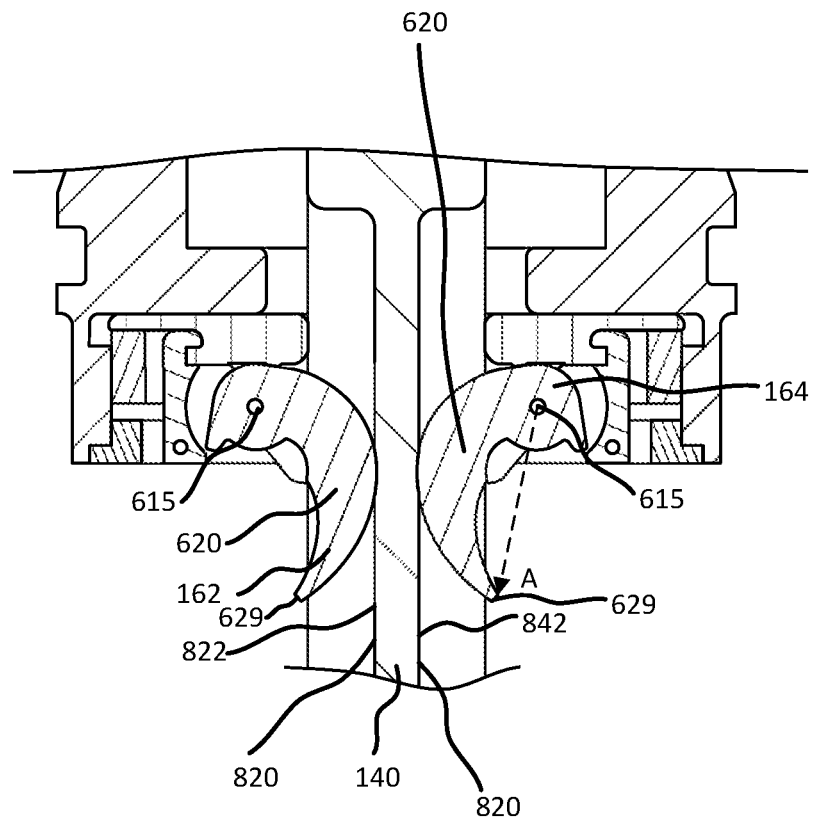
FIG. 10B illustrates a cross-section of a portion of a shock strut assembly having a first damping actor configuration, in accordance with various embodiments.

Referring now to FIGS. 10A-17B, the retraction of first flow restrictor 162 and second flow restrictor 164 over various actor angles is illustrated, in accordance with various embodiments. Referring now to FIGS. 10A and 10B, cross-sections of a portion of a shock strut assembly having a first orientation (i.e., a first damping actor configuration corresponding to a first flow restrictor 162 and second flow restrictor 164 being deployed) is illustrated, in accordance with various embodiments. In the first damping actor configuration, the actor angle is approximately 0 degrees. In various embodiments, the actor angle is between −5 degrees and 5 degrees in the first damping actor configuration.

In various embodiments, the restrictor portion 620 of first flow restrictor 162 and second flow restrictor 164 are each disposed in a groove (e.g., groove 822 of second flute profile 820 for first flow restrictor 162 and groove 842 of second flute profile 820 for second flow restrictor 164). The restrictor portion 620 may at least partially contact a respective groove (e.g., restrictor portion 620 of first flow restrictor 162 may contact the groove 822 of second flute profile 820 and restrictor portion 620 of second flow restrictor 164 may contact the groove 842 of second flute profile 820). A restrictor angle may be defined about a centerline of aperture 615. For example, a 0 degree position may be defined by a vector (e.g., vector A) extending perpendicular from the centerline of aperture 615 of each flow restrictor (e.g., aperture 615 of first flow restrictor 162 and aperture 615 of second flow restrictor 164) to a tail end 629 of each flow restrictor (e.g., tail end 629 of first flow restrictor 162 and tail end 629 of second flow restrictor 164). In the first damping actor configuration, the flow restrictor angle for each flow restrictor may be 0 degrees by definition (i.e., the first damping configuration sets a first orientation about which the restrictor angle is measured from). In various embodiments, when the flow restrictor is fully deployed, the restrictor angle is 0 degrees by definition.

Figure 11A:
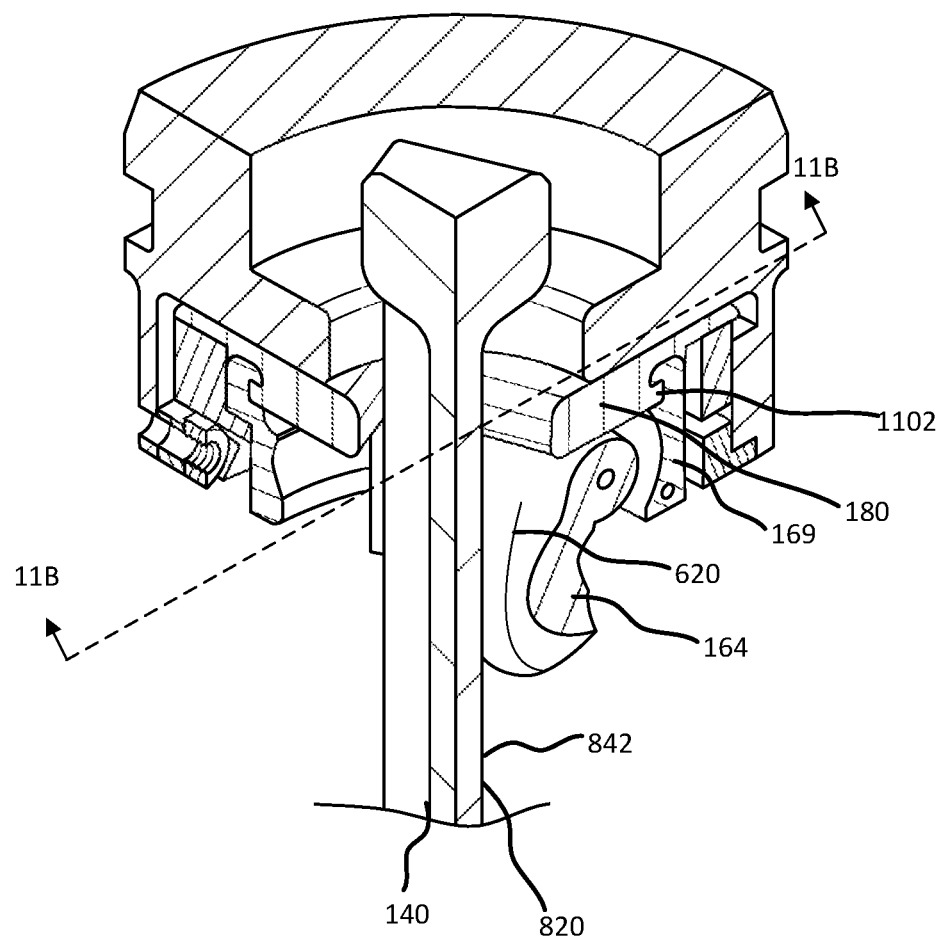
FIG. 11A illustrates a cross-section of a portion of a shock strut assembly having a first orientation, in accordance with various embodiments.
Figure 11B:
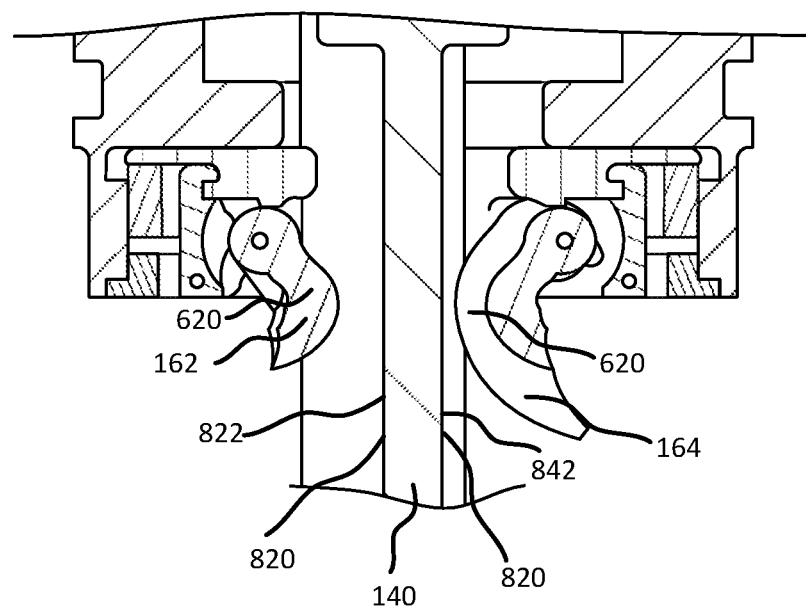
FIG. 11B illustrates a cross-section of a portion of a shock strut assembly having a first orientation, in accordance with various embodiments.

Referring now to FIGS. 11A and 11B, cross-sections of a portion of a shock strut assembly having a first orientation (i.e., an actor angle between a first damping actor configuration (e.g., fully deploy flow restrictor) and a second damping actor configuration (e.g., a fully retracted flow restrictor)) is illustrated, in accordance with various embodiments. In the first orientation, the actor angle is approximately 22.5 degrees. In various embodiments, the actor angle is between 20 degrees and 25 degrees in the first orientation.

In various embodiments, the restrictor portion 620 of first flow restrictor 162 and second flow restrictor 164 each remain partially disposed in a groove (e.g., groove 822 of second flute profile 820 for first flow restrictor 162 and groove 842 of second flute profile 820 for second flow restrictor 164). The restrictor portion 620 may at least partially contact a respective groove (e.g., restrictor portion 620 of first flow restrictor 162 may contact the groove 822 of second flute profile 820 and restrictor portion 620 of second flow restrictor 164 may contact the groove 842 of second flute profile 820). In the first orientation, the restrictor angle for each flow restrictor may be approximately 0 degrees. In various embodiments, the flow restrictor angle is between 0 degrees and 5 degrees in the first orientation.

With brief reference to FIGS. 6, 7 and 11A-B, in the first orientation, a protrusion of a flow restrictor may be proximate a first end of guide ramp 710 (e.g., a protrusion 618 of first flow restrictor 162 may be proximate a first end of guide ramp 710 of a first orbit cam 167. In various embodiments, main orifice plate 180 may further comprise a tongue 1102 disposed at a proximal end of the main orifice plate 180 and extending in the radial direction. The tongue 1102 may be received in the groove 736 of second orbit cam 169. As metering pin 140 is further rotated about its center axis, the metering pin 140 applies a torque to main orifice plate 180. The metering pin 140 may drive the rotation of the main orifice plate 180 while the second orbit cam 169 remains stationary. The respective protrusion may be guided by guide ramp 710 and begin to retract the respective flow restrictor (e.g., protrusion 618 of first flow restrictor 162 may be guided by guide ramp 710 of first orbit cam 167).

Figure 12A:
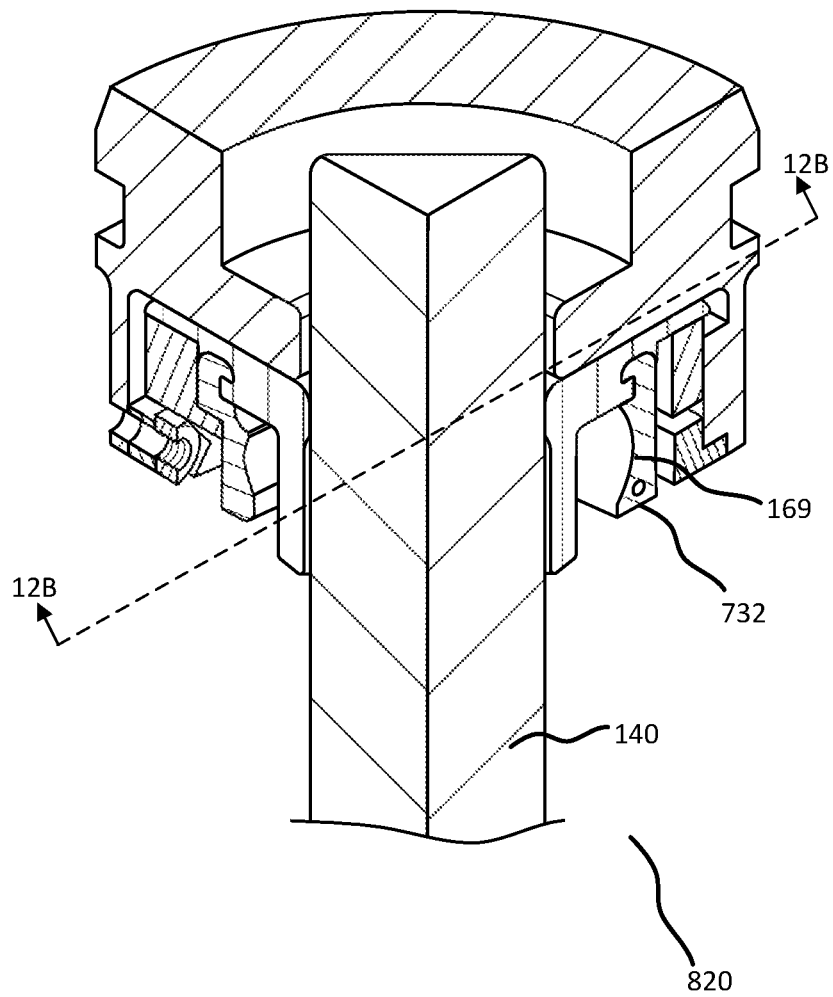
FIG. 12A illustrates a cross-section of a portion of a shock strut assembly having a second orientation, in accordance with various embodiments.
Figure 12B:
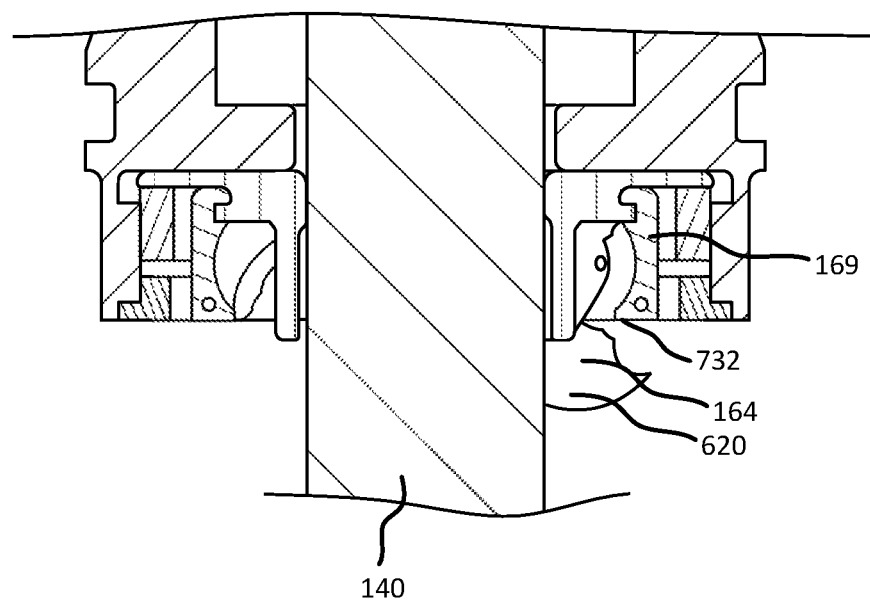
FIG. 12B illustrates a cross-section of a portion of a shock strut assembly having a second orientation, in accordance with various embodiments.

Referring now to FIGS. 12A and 12B, cross-sections of a portion of a shock strut assembly having a second orientation (i.e., an actor angle between the first orientation and a second damping actor configuration (e.g., a fully retracted flow restrictor)) is illustrated, in accordance with various embodiments. In the second orientation, the actor angle is approximately 45 degrees. In various embodiments, the actor angle is between 40 degrees and 50 degrees in the second orientation.

In various embodiments, the restrictor portion 620 of first flow restrictor and second flow restrictor 164 may be partially removed from the original groove from first damping actor configuration and first orientation (e.g., second flow restrictor 164 may be disposed outside of groove 842 for second flow restrictor 164 from FIG. 11B). In the second orientation, the restrictor angle for each flow restrictor may be approximately 14 degrees. In various embodiments, restrictor angle may be between 10 degrees and 19 degrees in second orientation.

With brief reference to FIGS. 6, 7 and 12A-B, in the second orientation, a protrusion of a flow restrictor may be disposed a first axial distance from a proximal end 732 of a respective orbit cam on guide ramp 710 (e.g., a protrusion 618 of second flow restrictor 164 may be an axial distance from the proximal end 732 of second orbit cam 169 on guide ramp 710). As the protrusion 618 of second flow restrictor 164 travels on the guide ramp 710, the head portion 610 of second flow restrictor 164 pivots about the aperture 615 of second flow restrictor 164 and alters the flow restrictor angle as the second flow restrictor 164 begins to retract. As metering pin 140 is further rotated about its center axis, the respective protrusion may be guided by guide ramp 710 and begin to retract the respective flow restrictor (e.g., protrusion 618 of first flow restrictor 162 may be guided by guide ramp 710 of first orbit cam 167).

Figure 13A:
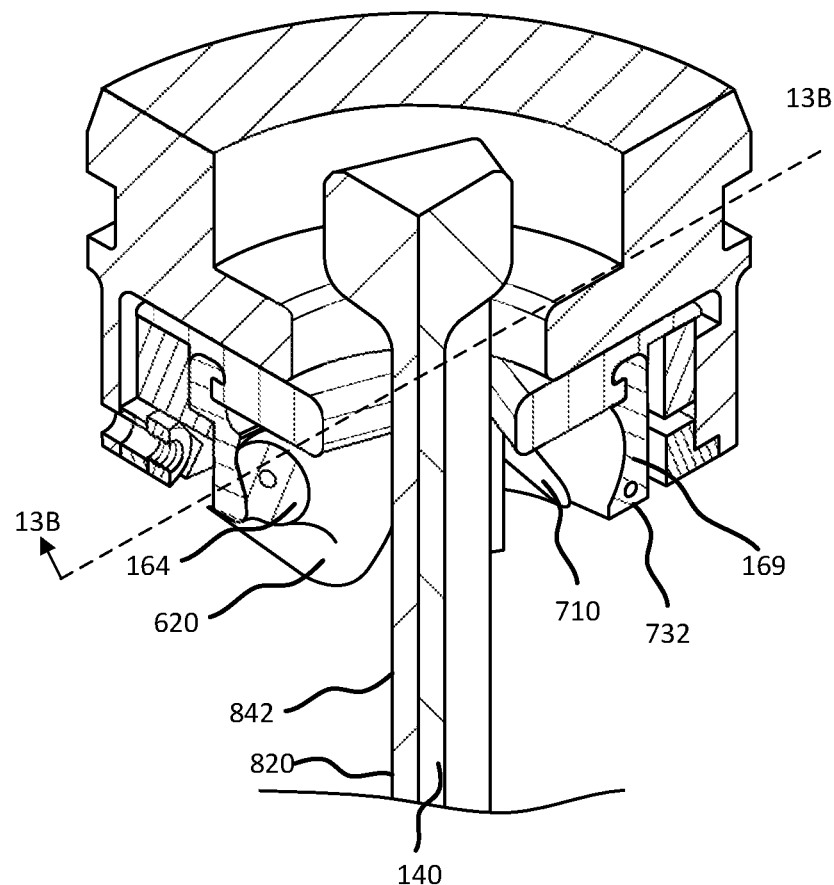
FIG. 13A illustrates a cross-section of a portion of a shock strut assembly having a third orientation, in accordance with various embodiments.
Figure 13B:
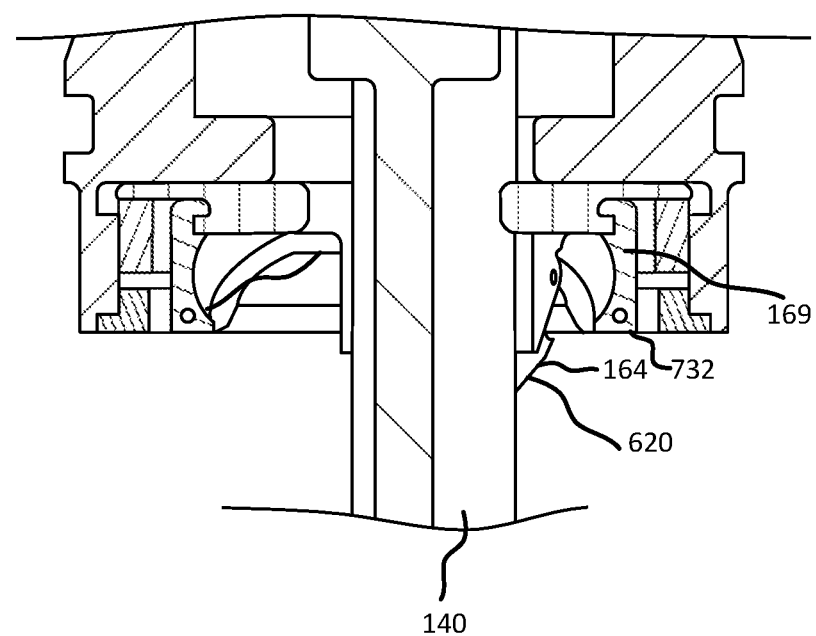
FIG. 13B illustrates a cross-section of a portion of a shock strut assembly having a third orientation, in accordance with various embodiments.

Referring now to FIGS. 13A and 13B, cross-sections of a portion of a shock strut assembly having a third orientation (i.e., an actor angle between the first and second orientation and a first and second damping actor configuration (e.g., a fully retracted flow restrictor)) is illustrated, in accordance with various embodiments. In the third orientation, the actor angle is approximately 67.5 degrees. In various embodiments, the actor angle is between 62.5 degrees and 72.5 degrees in the third orientation.

In various embodiments, the restrictor portion 620 of first flow restrictor and second flow restrictor 164 each remain proximate their respective grooves compared to first actor configuration, first orientation, and second orientation (e.g., groove 842 of second flute profile 820 for second flow restrictor 164). The restrictor portion 620 may be spaced apart from the respective groove (e.g., restrictor portion 620 of second flow restrictor 164 may be spaced apart from groove 842 of second flute profile 820). In the third orientation, the restrictor angle for each flow restrictor may be approximately 57 degrees. In various embodiments, the restrictor angle may be between 52 degrees and 62 degrees in the third orientation.

With brief reference to FIGS. 6, 7 and 13A-B, in the third orientation, a protrusion of a flow restrictor may be disposed a second axial distance from a proximal end 732 of a respective orbit cam on guide ramp 710 (e.g., a protrusion 618 of second flow restrictor 164 may be an axial distance from the proximal end 732 of second orbit cam 169 on guide ramp 710). The second axial distance may be greater than the first axial distance in the second orientation. As the protrusion 618 of second flow restrictor 164 travels on the guide ramp 710, the head portion 610 of second flow restrictor 164 pivots about the aperture 615 of second flow restrictor 164 and alters the flow restrictor angle as the second flow restrictor 164 continues to retract. As metering pin 140 is further rotated about its center axis, the protrusion 618 may be guided by guide ramp 710 and continue to retract the respective flow restrictor (e.g., protrusion 618 of first flow restrictor 162 may be guided by guide ramp 710 of first orbit cam 167).

Figure 14A:
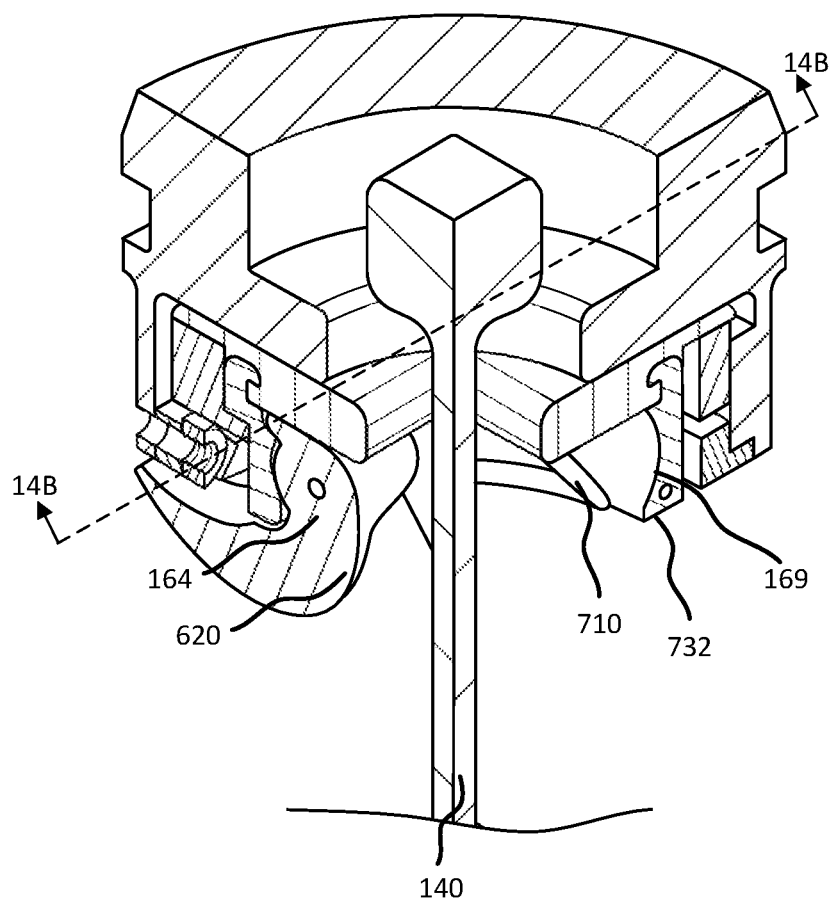
FIG. 14A illustrates a cross-section of a portion of a shock strut assembly having a second damping actor configuration, in accordance with various embodiments.
Figure 14B:
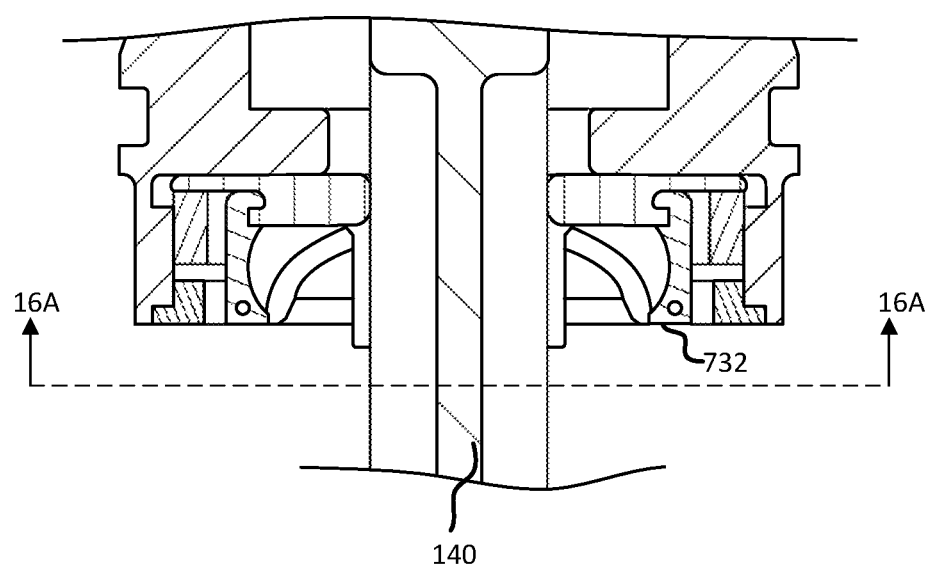
FIG. 14B illustrates a cross-section of a portion of a shock strut assembly having a second damping actor configuration, in accordance with various embodiments.

Referring now to FIGS. 14A and 43B, cross-sections of a portion of a shock strut assembly having a second actor damping configuration (i.e., an orientation where with fully retracted flow restrictors) is illustrated, in accordance with various embodiments. In the second actor damping configuration, the actor angle is approximately 90 degrees. In various embodiments, the actor angle is between 80 degrees and 100 degrees in the second actor damping configuration. In the second damping actor configuration, the restrictor angle for each flow restrictor may be approximately 81 degrees. In various embodiments, the restrictor angle may be between 76 degrees and 86 degrees in the third orientation.

With brief reference to FIGS. 6, 7 and 13A-B, in the second damping actor configuration, a protrusion of a flow restrictor may be disposed a third axial distance from a proximal end 732 of a respective orbit cam on guide ramp 710 (e.g., a protrusion 618 of second flow restrictor 164 may be an axial distance from the proximal end 732 of second orbit cam 169 on guide ramp 710). The third axial distance may be greater than the first axial distance in the second orientation and the second axial distance in the third orientation. As the protrusion 618 of second flow restrictor 164 travels on the guide ramp 710, the head portion 610 of second flow restrictor 164 pivots about the aperture 615 of second flow restrictor 164 and alters the flow restrictor angle as the second flow restrictor 164 retracts entirely as it rotates from the third orientation to the second damping actor configuration. As metering pin 140 is further rotated about its center axis, the protrusion 618 may be guided by guide ramp 710 and retract the respective flow restrictor (e.g., protrusion 618 of first flow restrictor 162 may be guided by guide ramp 710 of first orbit cam 167).

Figure 15:
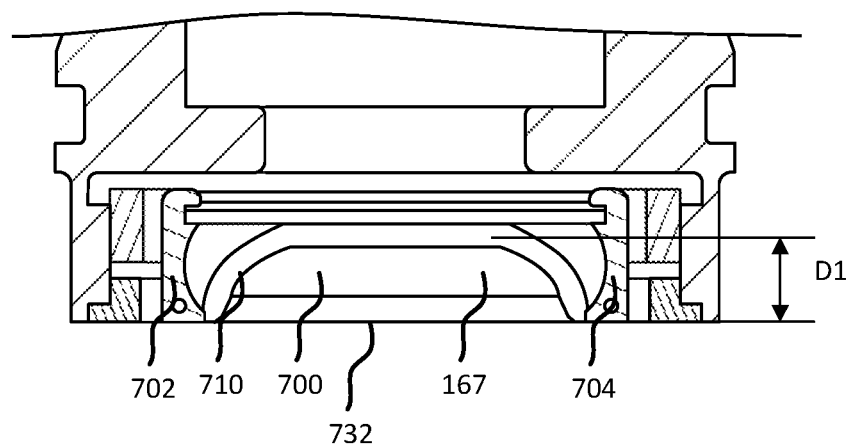
FIG. 15 illustrates a portion of a main orifice assembly with a main orifice plate, metering pin, and flow restrictors hidden, in accordance with various embodiments.

Referring now to FIG. 15, a cross-section of a portion of a shock strut assembly having with the metering pin and the main orifice plate hidden is illustrated, in accordance with various embodiments. In various embodiments, guide ramp 710 of orbit cam 700 extends axially away from proximal end 732 as it travels circumferentially away from first mating surface 702 and towards second mating surface 704 until it reaches a maximum axial distance D1 from proximal end 732 before it starts to extend axially towards proximal end 732 as it continues extending circumferentially until it reaches second mating surface 704.

Figure 16:
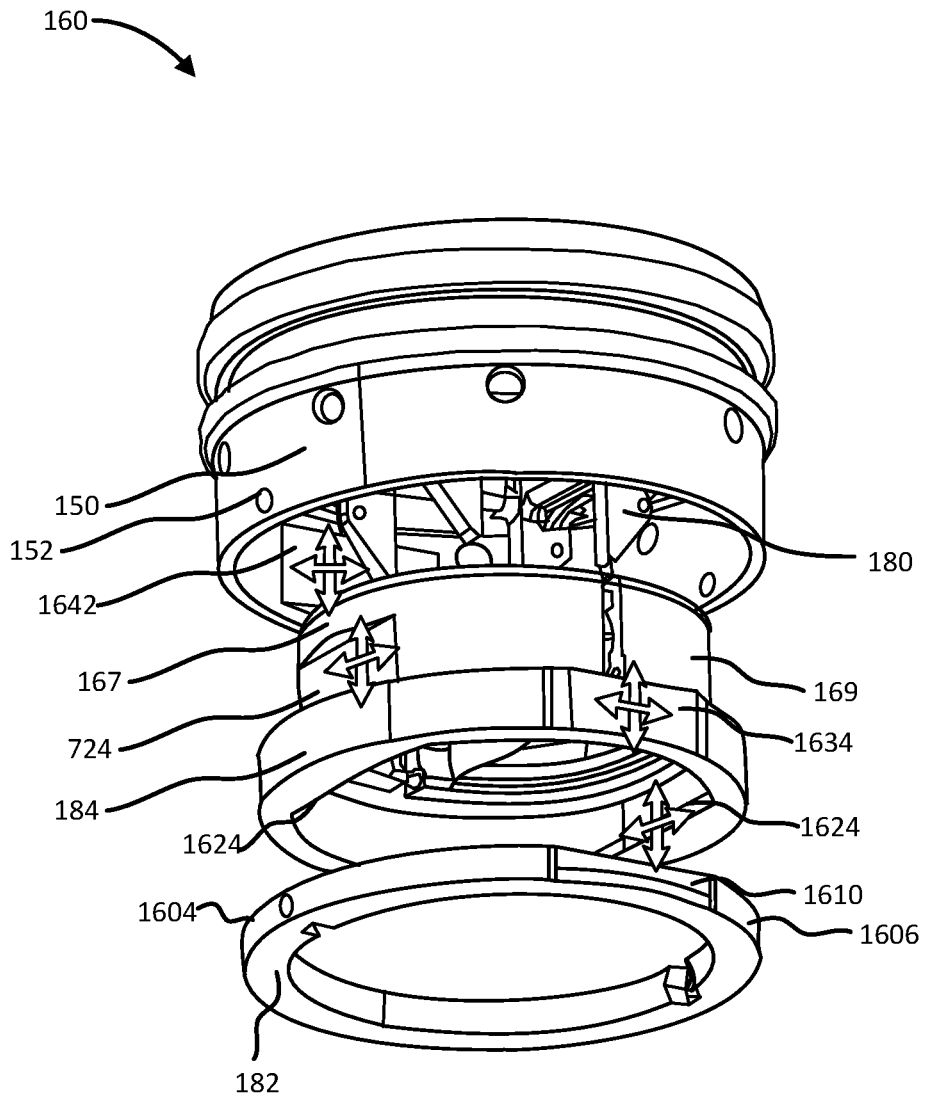
FIG. 16 illustrates an exploded view of a main orifice assembly, in accordance with various embodiments.

Referring now to FIG. 16, an exploded view of a portion of a main orifice assembly 160, in accordance with various embodiments, is illustrated. In various embodiments, the orbit cams may have radial freedom along one line of motion while remaining clocked with the outer support tube. This may be accomplished by including four flat mating surfaces disposed approximately 90 degrees apart amongst multiple components. For example, flat recess 724 of first orbit cam 167 may interface with a first flat recess 1624 disposed on a radially inner surface of main orifice plate retainer 184. Similarly, flat recess 724 of second orbit cam 169 may interface with a second flat recess 1626 disposed radially opposite the first flat recess 1624.

The main orifice plate retainer 184 may further comprise a first flat mating surface 1634 disposed on a radially outer surface of main orifice plate retainer 184 and a second flat mating surface disposed opposite the first flat mating surface. Each flat mating surface of the main orifice plate retainer 184 may mate with a corresponding flat mating surface of the orifice support tube 150. For example, the second flat mating surface may mate with a second flat mating surface 1642 disposed on a radially inner surface of orifice support tube 150. Similarly, first flat mating surface 1634 may mate with a first flat mating surface disposed on a radially inner surface of orifice support tube 150, the first flat mating surface disposed radially opposite the second flat mating surface 1642.

The flat mating surface allow the metering pin, the main orifice plate 180, first orbit cam 167, and second orbit cam 169 to translate together radially, while maintaining the first orbit cam 167 and the second orbit cam 169 aligned with the orifice support tube 150 in terms of actor angle. In various embodiments, the main orifice assembly 160 is configured to allow the first orbit cam 167 and the second orbit cam 169 to be disposed radially inward of the orifice plate mount 182 and slide relative to the main orifice plate mount in linear directions, while preventing rotation of the first orbit cam 167 and the second orbit cam 169.

The main orifice assembly 160 may be configured to allow axial travel of the main orifice plate 180 during operation of a respective shock strut assembly. For example, main orifice plate mount 182 may mount the main orifice plate retainer 184, first orbit cam 167, second orbit cam 169, and main orifice plate 180 within coupling end 152 of orifice support tube 150 loosely in the axially direction. As such, main orifice plate 180 may be configured to travel axially within the coupling end 152 and/or rotate about a centerline of a respective metering pin.

Figures 17A, 17B:
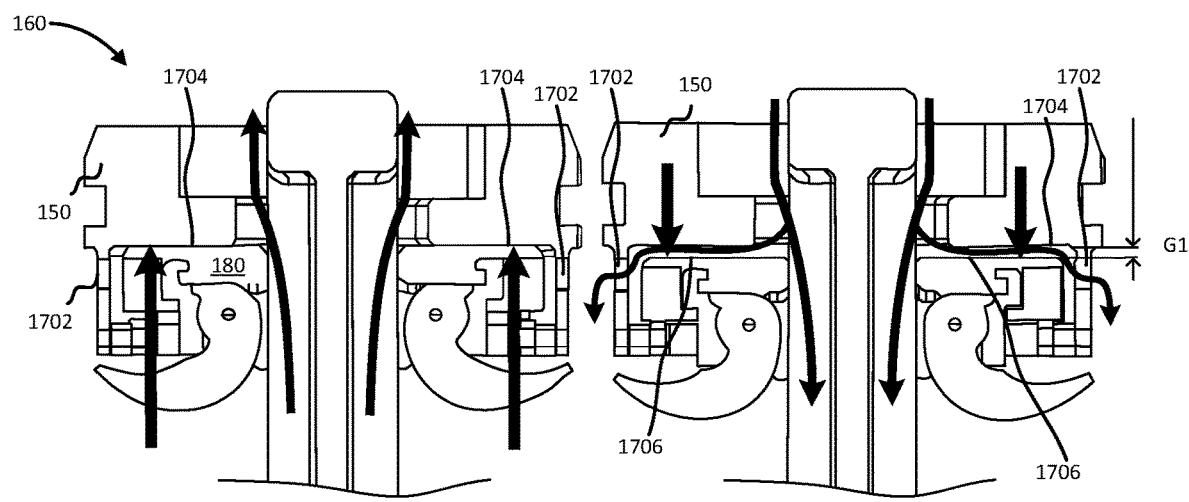
FIG. 17A illustrates a portion of a shock strut assembly during strut compression, in accordance with various embodiments.
FIG. 17B illustrates a portion of a shock strut assembly during strut extension, in accordance with various embodiments.

Referring now to FIGS. 17A and 17B, a main orifice assembly 160 during operation of a shock strut assembly, in accordance with various embodiments, is illustrated. FIG. 17A illustrates oil flow during strut compression, and FIG. 17B illustrates oil flow during strut extension, in accordance with various embodiments. The coupling end 152 may further comprise a plurality of bypass flow apertures 1702.

With reference to FIGS. 1 and 17A, during strut compression, oil flows from oil chamber 134 through main orifice assembly 160 and into orifice support tube 150. During the strut compression, main orifice plate 180 may be configured to travel axial in coupling end 152 of orifice support tube 150 and contact an axial surface 1704 of coupling end 152. By contacting the axial surface 1704 of coupling end 152, the main orifice plate 180 may act as a seal between the oil flow between oil chamber 134 and orifice support tube 150 and the plurality of bypass flow apertures 1702.

With reference now to FIGS. 1 and 17B, during strut extension, oil flows from orifice support tube 150 through the main orifice assembly 160 and into oil chamber 134. The main orifice plate 180 may be configured to separate axially from axial surface 1704 of coupling end 152. In this regard, a bypass flow path may be created between the axial surface 1704 and an axial surface 1706 of main orifice plate 180 through the plurality of bypass flow apertures 1702. The separation between the axial surface 1704 of the coupling end 152 and the axial surface 1706 of the main orifice plate may be separated by a gap G1. The gap G1 may be a design consideration and/or may be varied based on damping actor angle to meet a desired damping curve for a damping actor configuration. For example, G1 may vary for a given main orifice plate 180 as a function of circumferential position, or G1 may be fixed and varied based on initial design considerations. In a design where G1 varies as a function of circumferential position, a gap G1 can correspond with a damping actor configuration to either provide higher damping or lower damping. For example, a larger G1 may corresponded to a lesser damping curve, whereas a smaller G1 may correspond to a greater damping curve.

Figure 18:
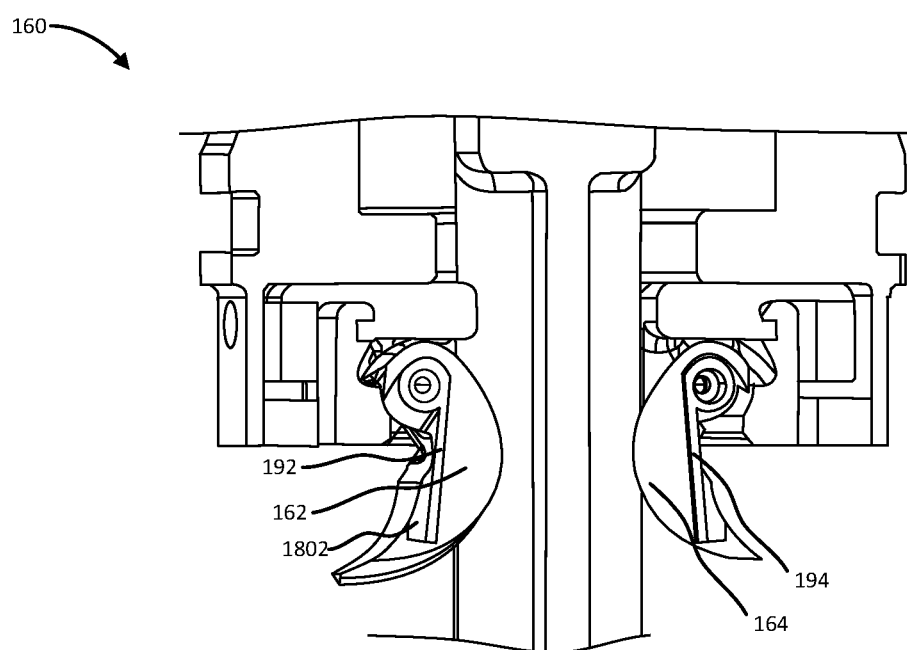
FIG. 18 illustrates a portion of a shock strut assembly, in accordance with various embodiments.

Referring now to FIG. 18, a main orifice assembly 160, in accordance with various embodiments, is illustrated. Main orifice assembly 160 may further comprise first spring 192 coupled to first flow restrictor 162 and second spring 194 coupled to second flow restrictor 164. Each spring 192, 194 may be any spring known in the art, such as a mooring ring spring, or the like. Each flow restrictor may further comprise a spring pocket defined at least partially by first recess 626 and second recess 619, as defined in FIG. 6. For example, first flow restrictor 162 may comprise a spring pocket 1802 configured to house the first spring 192.

In various embodiments, each spring deflection curve may be relatively flat (i.e., the curve may plateau at a threshold displacement). A spring force of each spring may be minimized resulting in reduced torque to change damping actor configurations and reducing restriction of the flow restrictors for oil refilling the hydraulic chamber when the strut is extending.

Figure 19:
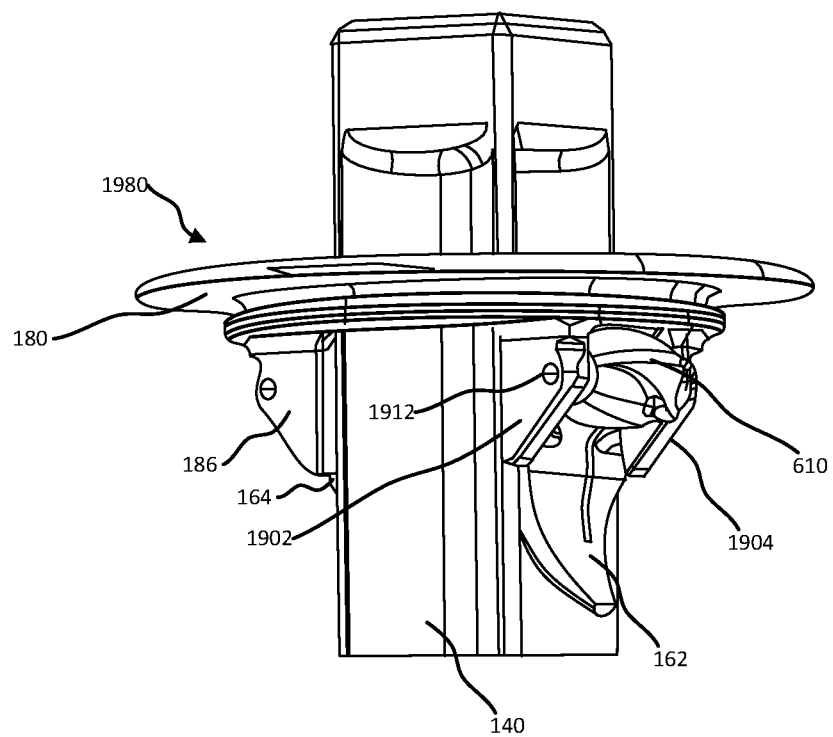
FIG. 19 illustrates a metering plate assembly and a metering pin, in accordance with various embodiments.

Referring now to FIG. 19, a main orifice plate assembly 1980 and a metering pin 140, in accordance with various embodiments, is illustrated. In various embodiments, orifice plate assembly 1980 may comprise a metering plate 180, a first flow restrictor 162 coupled to the main orifice plate 180 and as second flow restrictor 164 coupled to the main orifice plate 180. In various embodiments, a first lug and a second lug in the plurality of lugs may be coupled to a respective flow restrictor. For example, first lug 1902 and second lug 1904 may define a flange fork. A head portion 610 of first flow restrictor 162 may be disposed in the flange fork. With combined reference to FIGS. 6 and 19, a pin may be disposed through a first aperture 1912 of first lug 1902 through aperture 615 of head portion 610 and through a corresponding second aperture of second lug 1904. The pin may act as a fulcrum for the first flow restrictor to rotate about.

In various embodiments, each lug in the plurality of lugs may extend axially beyond the head portion 610 of a respective flow restrictor. In this regard, each lug in the plurality of lugs 186 may restrict flow around the respective flow restrictor when positioned for maximum flute depth. A consistent level of leakage may be set based on a distance between each lug in the plurality of lugs 186 and the metering pin 140.

Figure 20:
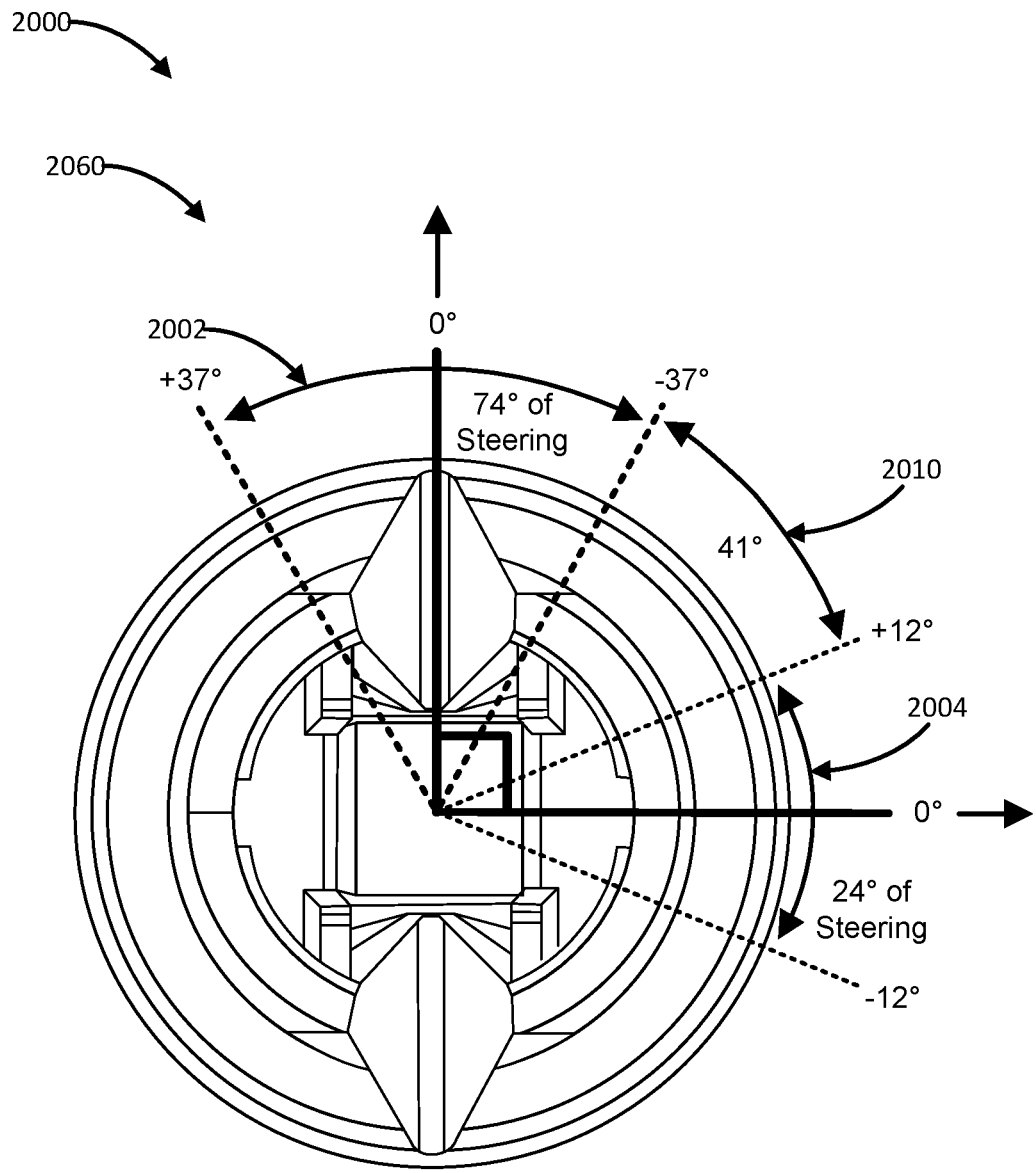
FIG. 20 illustrates a portion of a shock strut assembly, in accordance with various embodiments.

Referring now to FIG. 20, a portion of a shock strut assembly 2000 including a main orifice assembly 2060 from a bottom view, in accordance with various embodiments, is illustrated. "Bottom view," as referred to herein is a view looking from damping actor selector 170 towards orifice support tube 150 in FIG. 1. In various embodiments, shock strut assembly 2000 is for a steerable gear.

Referring back to FIG. 1, a "steering angle," as defined herein, is a relative clock angle between the strut cylinder 110 and the strut piston 120. A "damping actor selector (DAS) angle" as defined herein is a relative clock angle between the metering pin 140 and the strut piston 120. In various embodiments, the damping actor selector 170 rotates the metering pin 140 relative to the strut piston 120 and steering rotates the strut piston 120 relative to the strut cylinder 110. As such, the actor angle may be the sum of both the steering angle and the DAS angle.

As a steerable gear, the steering angle of shock strut assembly 2000 may be approximately 360 degrees. However, steering during a first damping actor configuration 2002 may be limited to a first steering range and/or steering during a second damping actor configuration 2004 may be limited to a second steering range. The steering ranges of each damping actor configuration may be a design choice.

Referring back to FIG. 20, an actor angle 2010 may be defined between a first damping actor configuration 2002 and a second damping actor configuration 2004 based on a steering range of each damping actor configuration. For example, with reference to FIGS. 7 and 20, if a first damping actor configuration 2002 has 74 degrees of steering (−37 degrees to 37 degrees from a neutral position), and the second damping actor configuration 2004 has 24 degrees of steering (−37 degrees to 37 degrees from a neutral position), and the neutral positions of the first damping actor configuration 2002 and the second damping actor configuration 2004 are 90 degrees apart (i.e., a 90 degree actor angle), a guide ramp 710 of an orbit cam 700 may span 41 degrees maximum (e.g., 90 degrees-12 degrees-37 degrees). Additionally, in this configuration, the start of the guide ramp may be at least 37 degrees from a first mating surface 702 and the maximum axial distance D1 may occur at a maximum of 88 degrees. Furthermore, the maximum axial distance D1 of the guide ramp may span at least 24 degrees, corresponding, at a minimum, to the steering angle while in the second damping actor configuration.

Referring to FIGS. 1 and 20, to change damping actor configuration (i.e., from first damping actor configuration 2002 to second damping actor configuration 2004), the damping actor selector 170 may rotate the metering pin clockwise or counterclockwise by the actor angle (e.g., 90 degrees in FIG. 20). In various embodiments, first damping actor configuration 2002 may correspond to a first flow restrictor 162 and second flow restrictor 164 being fully retracted. In various embodiments, second damping actor configuration 2004 may correspond to the first flow restrictor 162 and the second flow restrictor 164 being fully deployed. In various embodiments, first damping actor configuration may correspond to a damping curve configured for landing of an aircraft. In various embodiments, the second damping actor configuration may correspond to catapult of an aircraft.

Figure 21:
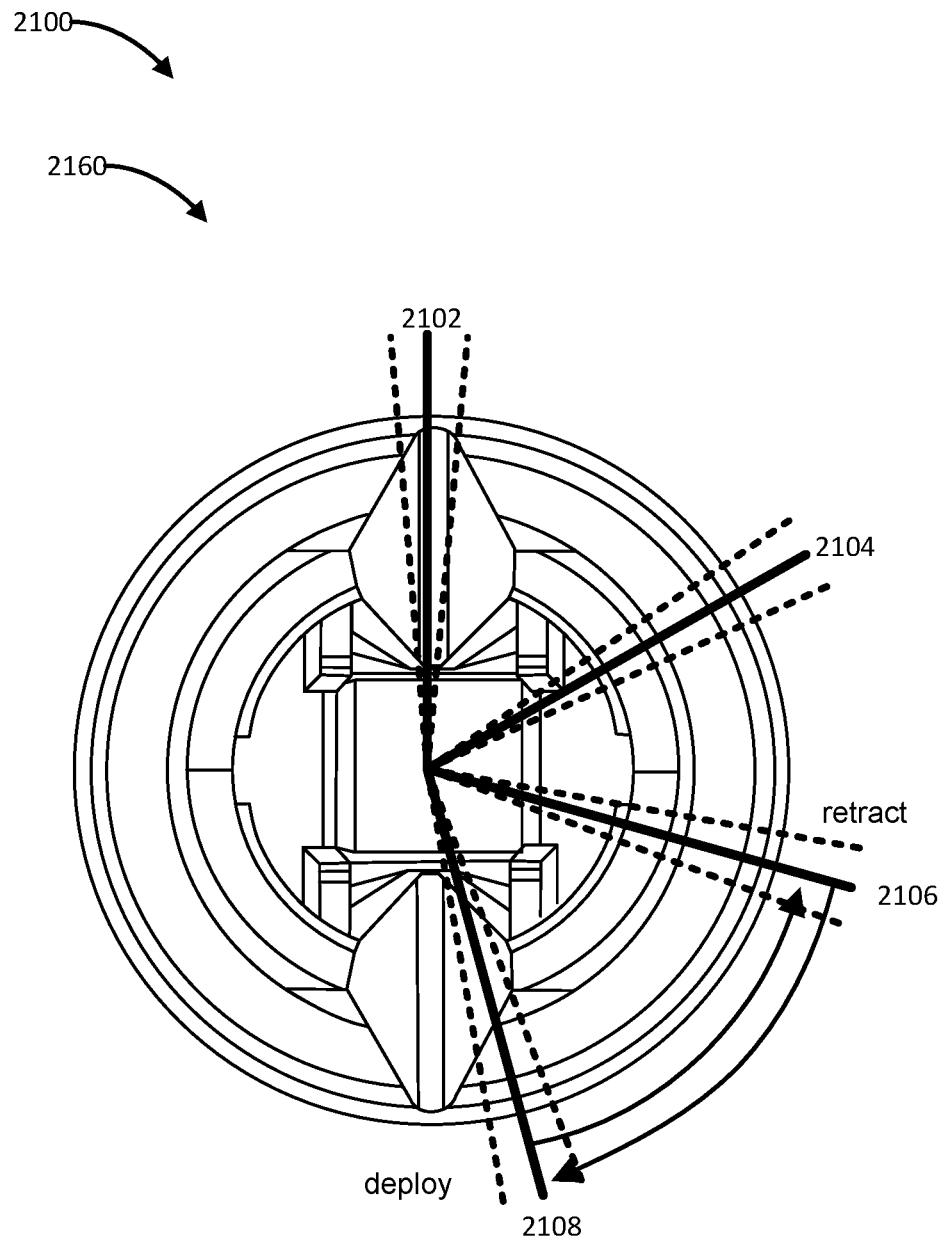
FIG. 21 illustrates a portion of a shock strut assembly, in accordance with various embodiments.

Referring now to FIG. 21, a portion of a shock strut assembly 2100 including a main orifice assembly 2160 from a bottom view, in accordance with various embodiments, is illustrated. In various embodiments, shock strut assembly 2100 is for a non-steerable gear. In various embodiments, a non-steerable gear may be configured to have multiple damping actor configurations. For example, a shock strut assembly 2100 for a non-steerable gear may comprise a first damping actor configuration 2102, a second damping actor configuration 2104, a third damping actor configuration 2106, and/or a fourth damping actor configuration 2108.

In various embodiments, the first damping actor configuration 2102 may correspond to a damping curve designed for a percolation event. Percolation occurs when restriction of gas and oil flow across the main orifice assembly 2160 when the hydraulic chamber is refilling after a landing gear has been stowed for flight. In the first damping actor configuration 2102, the main orifice assembly 2160 may open a large flow area between the hydraulic and gas chambers in order to facilitate a gas/oil migration between the chambers. This may allow an aircraft to safely land within a shorter time interval after lowering a gear.

In various embodiments, the second damping actor configuration 2104 may correspond to a damping curve designed for conventional takeoff and land (CTOL). In various embodiments, the third damping actor configuration 2106 may correspond to a damping curve designed for short takeoff and vertical landing (STOVL). The third damping actor configuration 2106 may be tuned for vertical landings. For example, the third damping configuration may provide greater energy absorption since spin-up and spring back effects may have less influence. The third damping actor configuration may also correspond to a damping curve designed for rough terrain.

In various embodiments, the fourth damping actor configuration 2108 may correspond to a damping curve designed for taxi of an aircraft. The fourth damping actor configuration may be optimized for ride quality, or the like.

Figure 22:
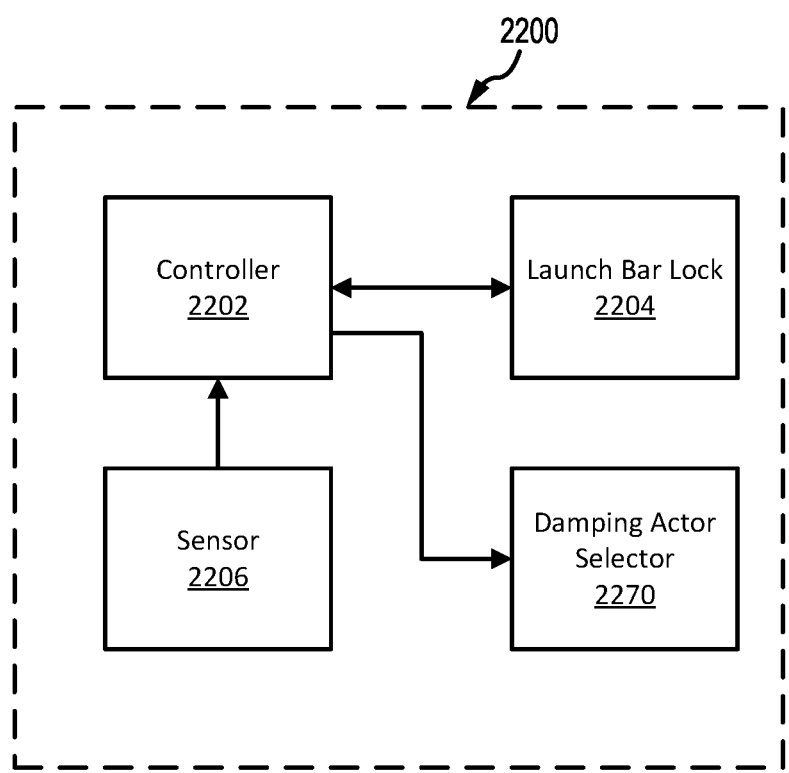
FIG. 22 illustrates an aircraft control system, in accordance with various embodiments.

In various embodiments and with additional reference to FIG. 22, a schematic block diagram of a control system 2200 for damping actor selector 2270 is illustrated. Control system 2200 includes a controller 2202 in electronic communication with a launch bar lock 2204 and a sensor 2206. In various embodiments, controller 2202 may be integrated into computer systems onboard aircraft. In various embodiments, controller 2202 may be configured as a central network element or hub to access various systems, engines, and components of control system 2200. Controller 2202 may comprise a network, computer-based system, and/or software components configured to provide an access point to various systems, engines, and components of control system 2200. In various embodiments, controller 2202 may comprise a processor. In various embodiments, controller 2202 may be implemented in a single processor. In various embodiments, controller 2202 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 2202 may comprise a processor configured to implement various logical operations in response to execution of instructions, for example, instructions stored on a non-transitory, tangible, computer-readable medium configured to communicate with controller 2202.

System program instructions and/or controller instructions may be loaded onto a non-transitory, tangible, computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 2202 may be in electronic communication with launch bar lock 2204 and/or sensor 2206. When launch bar lock 2204 is on, a switch may be closed and the launch bar lock 2204 may be engaged/locked. When launch bar lock 2204 is off, a switch may be closed, and the aircraft may be configured for a catapult launch. Sensor 2206 may comprise any load cell known in the art, such as a compression load cell, or the like. Sensor 2206 may be configured to measure a weight of on wheels and indicate whether the aircraft is on ground. Sensor 2206 and launch bar lock 2204 may be configured to transmit signals to controller 602, thereby providing a phase of flight to controller 2202.

In various embodiments, controller 2202 may receive a catapult command to extend a launch bar lock 2204 to a deck in order to configure the aircraft for a catapult launch. In response to the catapult command, the controller 2602 may command the damping actor selector 2270 to transition from a first damping actor configuration to a second damping actor configuration. In response, the damping actor selector 2270 may rotate the metering pin 140 and the main orifice plate 180 in a first direction about a central axis of the metering pin 140 and/or deploy a first flow restrictor 162 and/or a second flow restrictor 164. In various embodiments, when the sensor 2206 no longer measures a weight on wheels of the aircraft, the controller 2202 may command the damping actor selector 2270 to transition back from the second damping actor configuration to the first damping actor configuration. In this regard, the damping actor selector 2270 may rotate the metering pin 140 and the main orifice plate 180 in a second direction about the central axis of the metering pin 140 and/or retract the first flow restrictor 162 and or the second flow restrictor 164. The second direction may be opposite of the first direction.

In various embodiments, the launch bar lock 2204 may re-engage after catapult launch. In response, if the sensor still measures a weight on wheels when the launch bar lock 2204 re-engages a lock, the controller 2202 may command the damping actor selector 2270 to transition back from the second damping actor configuration to the first damping actor configuration. In this regard, the damping actor selector 2270 may rotate the metering pin 140 and the main orifice plate 180 in a second direction about the central axis of the metering pin 140 and/or retract the first flow restrictor 162 and or the second flow restrictor 164. The second direction may be opposite of the first direction.

In various embodiments, the controller 2202 may command the launch bar lock 2204 to re-engage after catapult launch. In response, if the sensor still measures a weight on wheels, the controller 2202 may command the damping actor selector 2270 to transition back from the second damping actor configuration to the first damping actor configuration. In this regard, the damping actor selector 2270 may rotate the metering pin 140 and the main orifice plate 180 in a second direction about the central axis of the metering pin 140 and/or retract the first flow restrictor 162 and or the second flow restrictor 164. The second direction may be opposite of the first direction.

Figure 23:
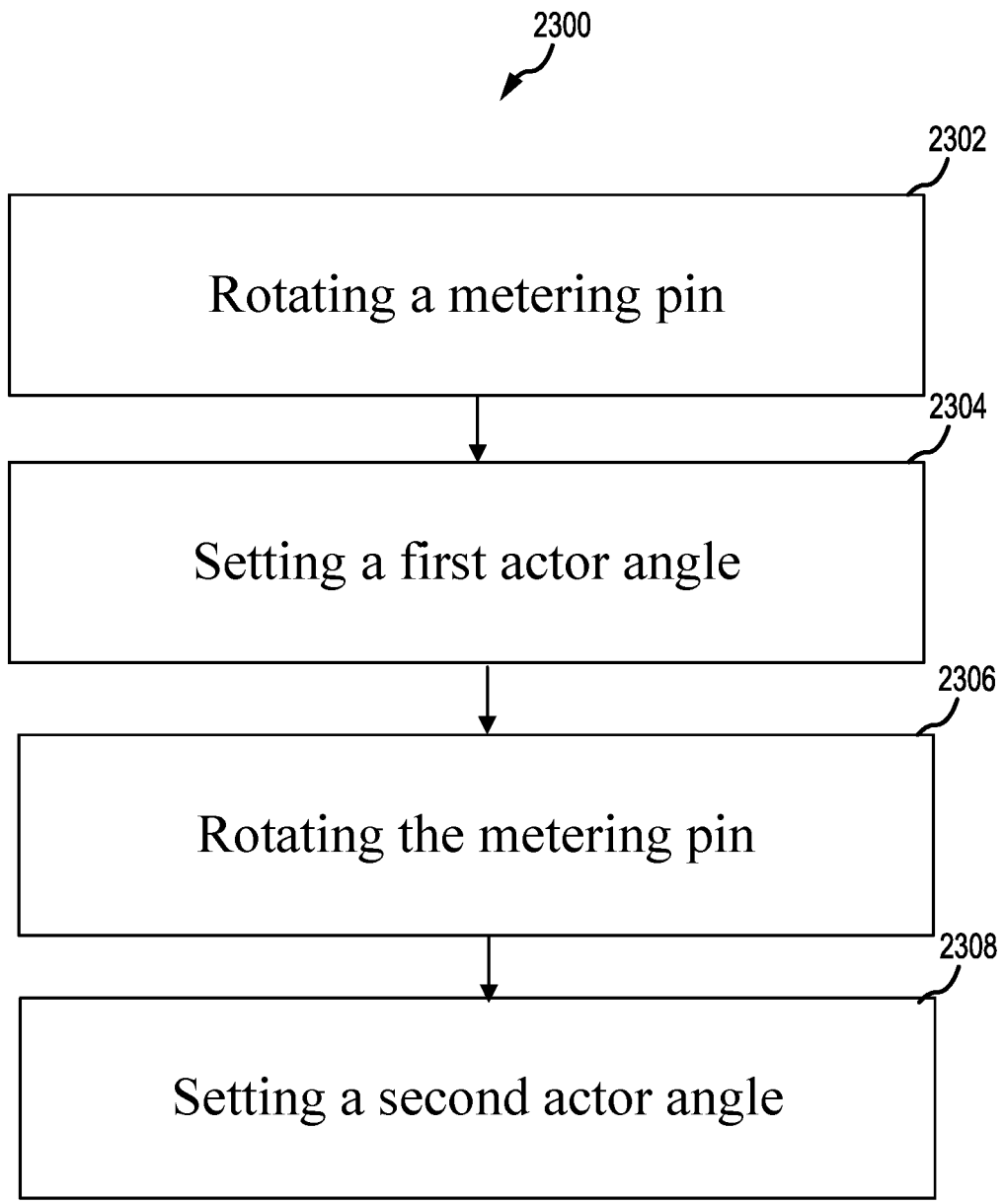
FIG. 23 illustrates a method of using a damping actor selector, in accordance with various embodiments.

Referring now to FIG. 23, a method 2300 of setting an actor angle of a multi-actor damping system is illustrated, in accordance with various embodiments. The method comprises rotating, via a damping actor selector, a metering pin about a central axis of the metering pin in a first direction from a default position (step 2302). The default position may correspond to a first damping actor configuration. The first damping actor configuration may comprise a damping curve configured for convention landing or the like. The damping actor selector may be in accordance with damping actor selector 170. The method may further comprise setting, via the damping actor selector, a first actor angle of the multi-actor damping system (step 2304). The first actor angle may correspond to a second damping actor configuration. The second damping actor configuration may comprise a damping curve configured for catapult launch, or the like.

The method may further comprise rotating, via the damping actor selector, the metering pin about the central axis of the metering pin in a second direction (step 2306). In various embodiments, the second direction may be the same as the first direction in a multi-actor damping system where with more than two damping actor configurations (e.g., for a non-steerable landing gear). In various embodiments, the second direction may be opposite the first direction in a multi-actor damping system where there are only two damping actor configurations (e.g., for a steerable landing gear). The method may further comprise setting a second actor angle (step 2308). The second actor angle may be different than the first actor angle. The second actor angle may correspond to the first damping actor configuration or a third damping actor configuration. The second actor angle may be the negative first actor angle in a steerable landing gear system. The third damping actor configuration may comprise a damping curve configured for short takeoff and vertical landing, taxi, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metering pin apparatus, comprising:
an elongated member extending from a first end to a second end, the elongated member defining an axis, the elongated member including a first side, a second side, a third side, and a fourth side, the first side disposed opposite the third side and the second side disposed opposite the fourth side, the elongated member configured to transfer torque about the axis;
a first flute profile disposed in the first side, the first flute profile comprising a first groove; and
a second flute profile disposed in the second side, the second flute profile comprising a second groove, wherein:
the first flute profile extends a first length along the elongated member,
the second flute profile extends a second length along the elongated member,
the first length is greater than the second length,
the first flute profile is further disposed on the third side, and
the second flute profile is further disposed on the fourth side.

2. The metering pin apparatus of claim 1, wherein the first groove and the second groove are V-grooves.

3. The metering pin apparatus of claim 1, wherein a cross-section of the elongated member is substantially trapezoidal.

4. The metering pin apparatus of claim 1, wherein a cross-section of the elongated member is substantially square.

5. A multi-actor damping system, comprising:
a main orifice plate;
a metering pin configured to transfer torque from the metering pin to the main orifice plate, the metering pin configured to translate relative to the main orifice plate, the metering pin configured to transition the multi-actor damping system from a first damping actor configuration including a first damping curve to a second damping actor configuration including a second damping curve, the first damping curve being different from the second damping curve; and
a flow restrictor coupled to the main orifice plate, the flow restrictor configured to contact the metering pin in the first damping actor configuration, the flow restrictor configured to be separated from the metering pin in the second damping actor configuration.

6. The multi-actor damping system of claim 5, wherein the metering pin comprises an elongated body extending from a first end to a second end, the elongated body including a first side, a second side, a third side, and a fourth side, wherein the first side is disposed opposite the third side, and wherein the second side is disposed opposite the fourth side.

7. The multi-actor damping system of claim 6, wherein the first side comprises a first groove, and wherein the second side comprises a second groove.

8. The multi-actor damping system of claim 7, wherein the first groove extends a first length of the metering pin, wherein the second groove extends a second length of the metering pin, wherein the first length is greater than the second length.

9. The multi-actor damping system of claim 5, wherein the main orifice plate comprises an aperture, wherein the aperture is complementary to a cross-section shape of the metering pin.

10. The multi-actor damping system of claim 9, wherein the metering pin is disposed through the aperture.

11. A shock strut assembly, comprising:
a strut cylinder including a primary chamber;
a strut piston, the strut cylinder configured to receive the strut piston;
an orifice support tube positioned within the primary chamber of the strut cylinder;
a main orifice assembly disposed within the orifice support tube, the main orifice assembly including a main orifice plate;
a metering pin positioned within the primary chamber, the metering pin defining an axis, the metering pin configured to translate with the strut piston, the metering pin configured to rotate about the axis and transition the shock strut assembly from a first damping actor configuration to a second damping actor configuration; and
a flow restrictor coupled to the main orifice plate, the flow restrictor configured to contact the metering pin in the first damping actor configuration, the flow restrictor configured to be separated from the metering pin in the second damping actor configuration.

12. The shock strut assembly of claim 11, wherein the metering pin includes an elongated member, the elongated member including a quadrilateral cross section having a first side, a second side, a third side, and a fourth side, wherein the first side is opposite the third side and the second side is opposite the fourth side.

13. The shock strut assembly of claim 12, wherein the metering pin further comprises a first groove disposed on the first side, a second groove disposed on the second side, a third groove disposed on the third side; and a fourth groove disposed on the fourth side.

14. The shock strut assembly of claim 11 further comprising a damping actor selector configured to rotate the metering pin about the axis.

15. The shock strut assembly of claim 11, wherein the first damping actor configuration includes a first damping curve, wherein the second damping actor configuration includes a second damping curve, and wherein the first damping curve is different from the second damping curve.

16. The multi-actor damping system of claim 5, further comprising a damping actor selector configured to rotate the metering pin and the main orifice plate.

17. The multi-actor damping system of claim 5, wherein:
the metering pin defines an axis,
the metering pin is configured to translate axially along the axis, and
the metering pin is configured to rotate about the axis to transfer the torque from the metering pin to the main orifice plate.

* * * * *